US011300084B2

(12) United States Patent
Moragne

(10) Patent No.: US 11,300,084 B2
(45) Date of Patent: Apr. 12, 2022

(54) METHOD AND APPARATUS FOR HEATING A FUEL

(71) Applicant: Andrew Bradley Moragne, Lakewood, OH (US)

(72) Inventor: Andrew Bradley Moragne, Lakewood, OH (US)

(\*) Notice: Subject to any disclaimer, the term of this patent is extended or adjusted under 35 U.S.C. 154(b) by 522 days.

(21) Appl. No.: 15/181,000

(22) Filed: Jun. 13, 2016

(65) Prior Publication Data

US 2017/0356410 A1    Dec. 14, 2017

Related U.S. Application Data

(60) Provisional application No. 62/348,415, filed on Jun. 10, 2016.

(51) Int. Cl.
| | |
|---|---|
| *F02G 5/00* | (2006.01) |
| *F02M 53/02* | (2006.01) |
| *F02D 41/30* | (2006.01) |
| *F02D 19/02* | (2006.01) |
| *F02M 53/06* | (2006.01) |
| *F02M 53/04* | (2006.01) |
| *F02D 41/20* | (2006.01) |

(52) U.S. Cl.
CPC ........... *F02M 53/02* (2013.01); *F02D 19/022* (2013.01); *F02D 41/3041* (2013.01); *F02M 53/043* (2013.01); *F02M 53/06* (2013.01); *F02D 41/20* (2013.01); *F02D 2041/2065* (2013.01); *F02D 2200/0606* (2013.01); *Y02T 10/30* (2013.01)

(58) Field of Classification Search
CPC ..... F02M 53/02; F02M 51/06; F02D 41/3041

USPC .......................................... 123/557
See application file for complete search history.

(56) References Cited

U.S. PATENT DOCUMENTS

| | | | | | |
|---|---|---|---|---|---|
| 3,945,353 | A | * | 3/1976 | Dreisin | F01P 9/02 123/41.22 |
| 3,999,525 | A | * | 12/1976 | Stumpp | F02D 9/00 123/179.16 |
| 4,362,050 | A | | 12/1982 | Stumpp et al. | |
| 5,159,915 | A | * | 11/1992 | Saito | F02M 31/125 123/538 |
| 5,261,359 | A | | 11/1993 | Hull | |
| 6,315,217 | B1 | * | 11/2001 | Park | F02M 29/04 123/549 |
| 6,481,641 | B1 | * | 11/2002 | Mieney | B01J 19/26 239/128 |
| 7,162,994 | B2 | | 1/2007 | Li et al. | |
| 7,444,230 | B2 | | 10/2008 | Cheiky | |

(Continued)

FOREIGN PATENT DOCUMENTS

| | | | | | |
|---|---|---|---|---|---|
| FR | 2877055 | A1 | * | 4/2006 | ................ F01P 3/16 |
| WO | WO0190568 | | * | 11/2001 | ............. F02M 53/06 |

*Primary Examiner* — Hung Q Nguyen
*Assistant Examiner* — Anthony Donald Taylor, Jr.
(74) *Attorney, Agent, or Firm* — Thompson Coburn LLP

(57) ABSTRACT

A fuel heating apparatus and method are disclosed where a conductive coil is wrapped around an outer surface of at least a portion of a nozzle of a fuel injector. The coil and the nozzle are inductively cooperative with each other such that the coil, in response to a variable current through the coil, induces a heating of the nozzle. The inductively heated nozzle can heat fuel passing into an engine so as to cause the fuel to combust as it exits the heated nozzle. This arrangement allows for sparkless combustion of fuel in an internal combustion engine.

55 Claims, 12 Drawing Sheets

(56) References Cited

U.S. PATENT DOCUMENTS

| | | | |
|---|---|---|---|
| 7,503,166 | B2 | 3/2009 | Jankovic |
| 7,628,340 | B2 | 12/2009 | Czimmek |
| 7,677,468 | B2 | 3/2010 | Hornby et al. |
| 8,342,425 | B2* | 1/2013 | Imoehl ............... F02M 51/0671 239/133 |
| 8,439,018 | B2* | 5/2013 | Kabasin ................ F02M 53/06 123/549 |
| 8,688,402 | B2* | 4/2014 | Viale ...................... G01K 7/16 123/478 |
| 8,967,124 | B2 | 3/2015 | Hornby et al. |
| 9,556,845 | B2* | 1/2017 | Sasaki ................. F02D 41/064 |
| 2003/0178009 | A1* | 9/2003 | Pellizzari ............ F02D 41/003 123/549 |
| 2005/0257769 | A1 | 11/2005 | Li et al. |
| 2007/0113546 | A1 | 5/2007 | Jankovic |
| 2007/0221748 | A1* | 9/2007 | Hornby ................ F02M 31/125 239/135 |
| 2007/0221874 | A1* | 9/2007 | Hornby .............. F02M 51/0617 251/129.09 |
| 2007/0227492 | A1 | 10/2007 | Cheiky |
| 2007/0235086 | A1* | 10/2007 | Hornby .............. F02M 51/0671 137/334 |
| 2007/0235557 | A1* | 10/2007 | Hornby .............. F02M 51/0671 239/135 |
| 2008/0060621 | A1* | 3/2008 | Trapasso ............... F02M 31/125 123/557 |
| 2008/0127940 | A1* | 6/2008 | Stephan ................ F02M 53/06 123/445 |
| 2008/0127951 | A1* | 6/2008 | Gale ....................... F02D 41/20 123/549 |
| 2011/0057049 | A1* | 3/2011 | Hofbauer ............... F02M 53/02 239/5 |
| 2011/0209686 | A1 | 9/2011 | McCann |
| 2013/0081592 | A1* | 4/2013 | Boer ...................... F02M 53/02 123/299 |
| 2013/0104543 | A1* | 5/2013 | Zoldak ................ F02D 41/0057 60/605.2 |
| 2015/0020769 | A1 | 1/2015 | Huang et al. |
| 2015/0122217 | A1* | 5/2015 | Bullmer ................ F02M 53/02 123/295 |
| 2016/0025056 | A1* | 1/2016 | Smaldone ............. F02M 61/14 123/470 |

* cited by examiner

METHOD AND APPARATUS FOR HEATING A FUEL

CROSS-REFERENCE AND PRIORITY CLAIM TO RELATED PATENT APPLICATION

This patent application claims priority to U.S. provisional patent application Ser. No. 62/348,415, filed Jun. 10, 2016, and entitled "Method and Apparatus for Heating a Fuel", the entire disclosure of which is incorporated herein by reference.

INTRODUCTION

The vast majority of engineering systems and engineering machines are powered by a fuel of some type. The status of the fuel entering these machines or systems is largely dependent on the scope and application for which the machine or system was designed. In some applications, fuel may be added to the machine or system at an ambient temperature, while in other specialized environments the fuel may be cooled or heated for optimal efficiency and production.

One such system where fuel is used is the environment of internal combustion engines. Internal combustion engines are designed to accept a fuel input into the internal combustion engine's interior chambers. Within the interior chamber of the internal combustion engine, the fuel is reacted to provide operational power or propulsion to the machine or system powered by the internal combustion engine. An everyday example of such machines powered by internal combustion engines are on-highway vehicles, such as cars and trucks.

Many different processes have been developed over the years to react the fuel within these internal combustion engines. Some internal combustion engines are designed to react inputted fuel with the assistance of an outside conflagrant such as a spark or flame. Other internal combustion engines have been designed to react fuel without such outside aid relying solely on the internal combustion engine's ability to heat and pressurize the air entering the interior chambers. These differences in design direction affect the efficiency of the internal combustion engine and are important issues that must be considered in the development of machines associated with the internal combustion engine.

Optional fuel reaction environments are not the only issue which may be considered when developing an internal combustion engine. Operational efficiency and power output of internal combustion engines are also greatly affected by the type of fuel used within such engines. Internal combustion engines have been developed to operate with fuel consisting of different matter states (e.g. gas or liquid) and different chemical profiles. Some internal combustion engines use natural gas as the fuel for operational power. However, the majority of internal combustion engines used within today's marketplace operate with a liquid fuel, namely hydrocarbon fuels refined from crude oil.

A significant market share of internal combustion engines use either diesel or gasoline as the primary fuel source for operation. However, the design of these internal combustion engines differ greatly based on whether they react with diesel or gasoline fuel. Modern day diesel engines utilize compression to react the diesel fuel during the combustion process. The compression process is far more efficient than a traditional spark-based ignition process commonly used within gasoline engines. Diesel fuel, which is marginally more energy dense than gasoline fuel, can be used at an increased efficiency in compression ignition engines through the use of higher compression ratios. In gasoline-based internal combustion engines, higher compression ratios are difficult to implement because of pre-detonation that occurs when the air and gasoline fuel mixture excessively compress and ignite before the proper combustion cycle. Accordingly, the traditional approach used in gasoline-based internal combustion engines is to react the gasoline with a spark in order to create the necessary combustion for operation. With such a traditional design, if one did away with the aid of the spark plug and attempted to compression ignite the gasoline fuel similar to the manner used by diesel-based internal combustion engines, the gasoline would not be hot enough to solely combust.

Against this backdrop, the inventor believes that new and innovative techniques are needed to heat a fuel to or above an ignition point for the purpose of rapid combustion within an interior combustion chamber of an internal combustion engine.

To address such a need, the inventor seeks to develop a heating apparatus which can be used within multiple engine designs and is not limited by the chemical makeup and structure of the fuel used.

Fuel injectors are commonly used to feed a fuel into an engine compartment. The passage of fuel through these fuel injectors exits the fuel injector through a nozzle. For ideal compression-based combustion to occur with respect to an internal combustion engine, the fuel should be heated to an autoignition temperature as it leaves the fuel injector in order to maximize the operational efficiency of the internal combustion engine. To achieve such results, the inventor discloses example embodiments where there is a conductive coil wrapped around at least a portion of the outer surface of the nozzle. The conductive coil and the nozzle are inductively cooperative with each other when fashioned in such a design. Therefore, by passing a variable current through the conductive coil, inductive forces act upon the nozzle of the fuel injector which results in a heating of the nozzle. The heated nozzle in turn correspondingly heats the fuel within the flow path.

According to another example embodiment, the inventor discloses a method of heating a fuel. The disclosed method comprises inductively heating the nozzle of a fuel injector as a fuel flows through the nozzle. The fuel is then combusted as a result of the inductively heated nozzle.

Furthermore, the inventor discloses an example embodiment for an engine system used within a machine. The engine system may be an internal combustion engine as discussed above, and the engine system has a fuel injector, the fuel injector having a nozzle; and an ignition cylinder is present wherein at least a portion of the nozzle protrudes into the ignition cylinder. An electromagnetic inductor may then circumferentially envelop at least a portion of the nozzle. The electromagnetic inductor may be configured to receive a variable current to induce a current within the nozzle. This induced current causes an inductive heating of the nozzle, and the inductively heated nozzle can then heat any fuel flowing through the nozzle and into the ignition cylinder.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings.

DETAILED DESCRIPTION OF EXAMPLE EMBODIMENTS

Figure 1:
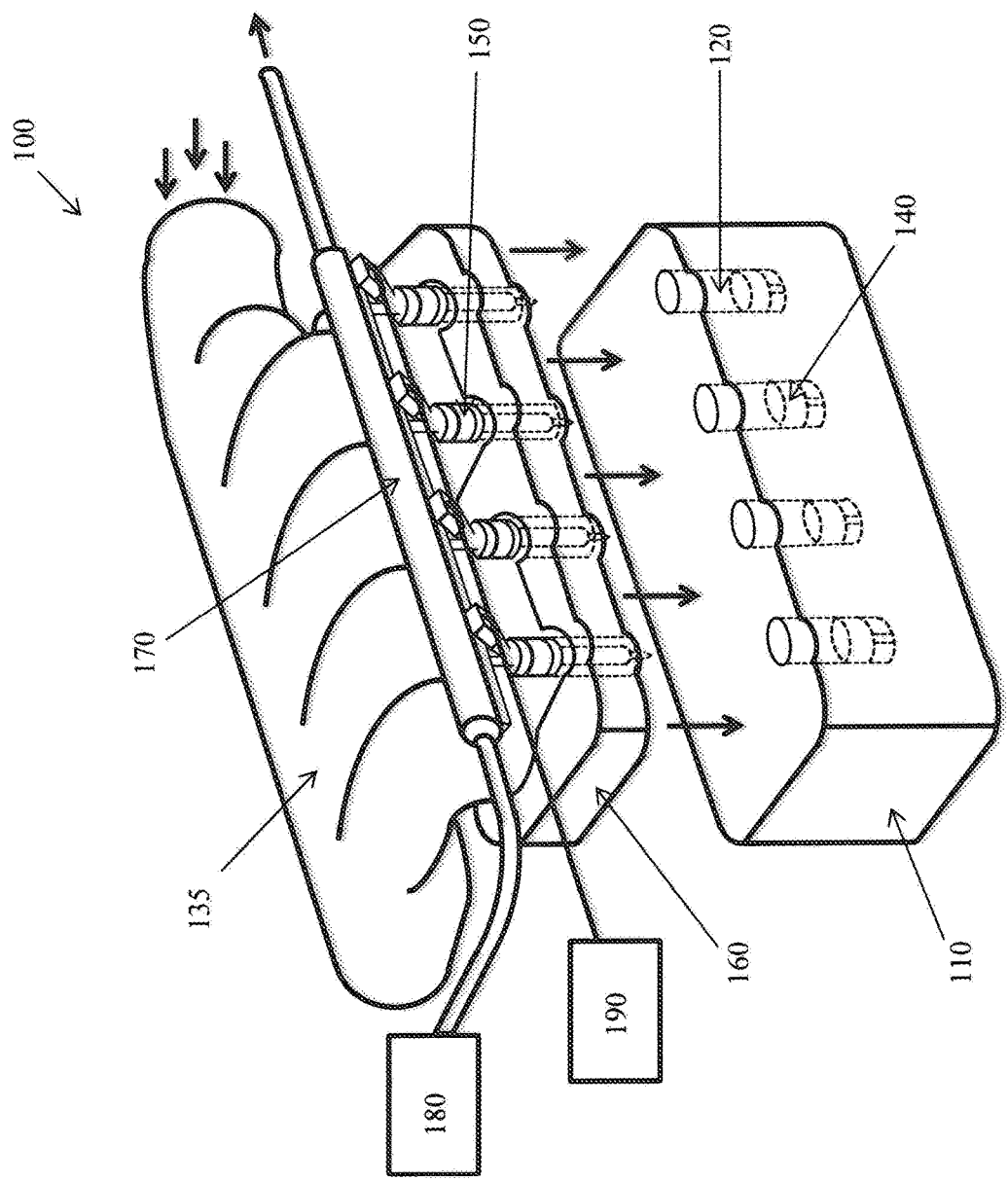
FIG. 1 illustrates a perspective view of an example engine with a plurality of fuel injectors.

Referring to the accompanying drawings in which like reference numbers indicate like elements, FIG. 1 illustrates an engine 100 which may be employed in a machine (not shown). The engine 100 may be any type of engine configured to use a fuel for the purpose of providing operational power to the machine. In an example embodiment, the engine 100 may be an internal combustion engine. The machine may utilize the operational power provided by the engine for locomotion purposes or for specific machine-designed functions such as but not limiting to dirt moving, pulling, cutting, power generation, or any other type of non-locomotive function specified within the design structure of the machine. In embodiments where the engine is an internal combustion engine, the machine may be an on-highway vehicle such as but not limited to automobiles, trucks, motorcycles or scooters. However, it should be understood that with other embodiment, the internal combustion engine can be used with off-highway vehicles, recreational vehicles, rail transportation vehicles or equipment, construction vehicles or equipment, agricultural vehicles or equipment, maritime use vehicles, military and police vehicles or aircraft, and commercial or recreational aircraft.

The engine 100, as viewed in FIG. 1, may have an engine block 110 encompassing the outside structure of the engine 100. The engine block 110 may be made of metal or an metallic alloy and may be sufficiently strong to protect the interior regions of the engine 100 from outside foreign debris, contaminants, or materials. The engine 100 may contain a plurality of ignition cylinders 120 positioned within the engine block 110. Within an ignition cylinder 120, a fuel may be combusted. In some example embodiments, the fuel may be mixed with air through an air intake 135 connected to the engine block 110. The combination of the fuel with the air when combusted creates a release of energy. This release of energy is used to push down a piston 140 of the engine 100 located below each ignition cylinder 120 to provide the operational power of the engine 100.

The plurality of ignition cylinders 120 may be arranged in different design configurations dependent on the model of the engine block 110. In some example embodiments the plurality of ignition cylinders 120 may form an inline linear configuration. In other example embodiments, the configuration of the plurality of ignition cylinders 120 may form a V-shaped design. A fuel injector 150 may be present above each ignition cylinder 120. Each fuel injector 150 may be contained within and travel through an ignition cylinder head 160. The ignition cylinder head 160 may be made of metal or metallic alloy similar to the engine block 110 and may be sufficiently strong to protect the fuel injectors 150 traveling through it from outside foreign debris, contaminants, or materials. The ignition cylinder head 160 is positioned above the engine block 110 providing a direct connection path from the fuel injectors 150 to the ignition cylinders 120. In many engine designs, a plurality of ignition cylinders 120 are present with an equal plurality of fuel injectors 150. The plurality of fuel injectors 150 may be interconnected with one another through a fuel rail 170. The fuel rail 170 allows for the passage of the fuel from a fuel tank 180 to travel into each of the fuel injectors 150. The fuel will then pass through the fuel injectors 150 and into the ignition cylinder 120 where it may be combusted. The amount of fuel released by the fuel rail 170 into each fuel injector 150 is dependent on a control system 190 attached to the engine 100. The control system 190, such as an electronic control unit, determines the amount of fuel entering each fuel injector 150 as well as a sequenced order of which fuel injectors 150 will be operational to provide optimal engine performance.

Figure 2:
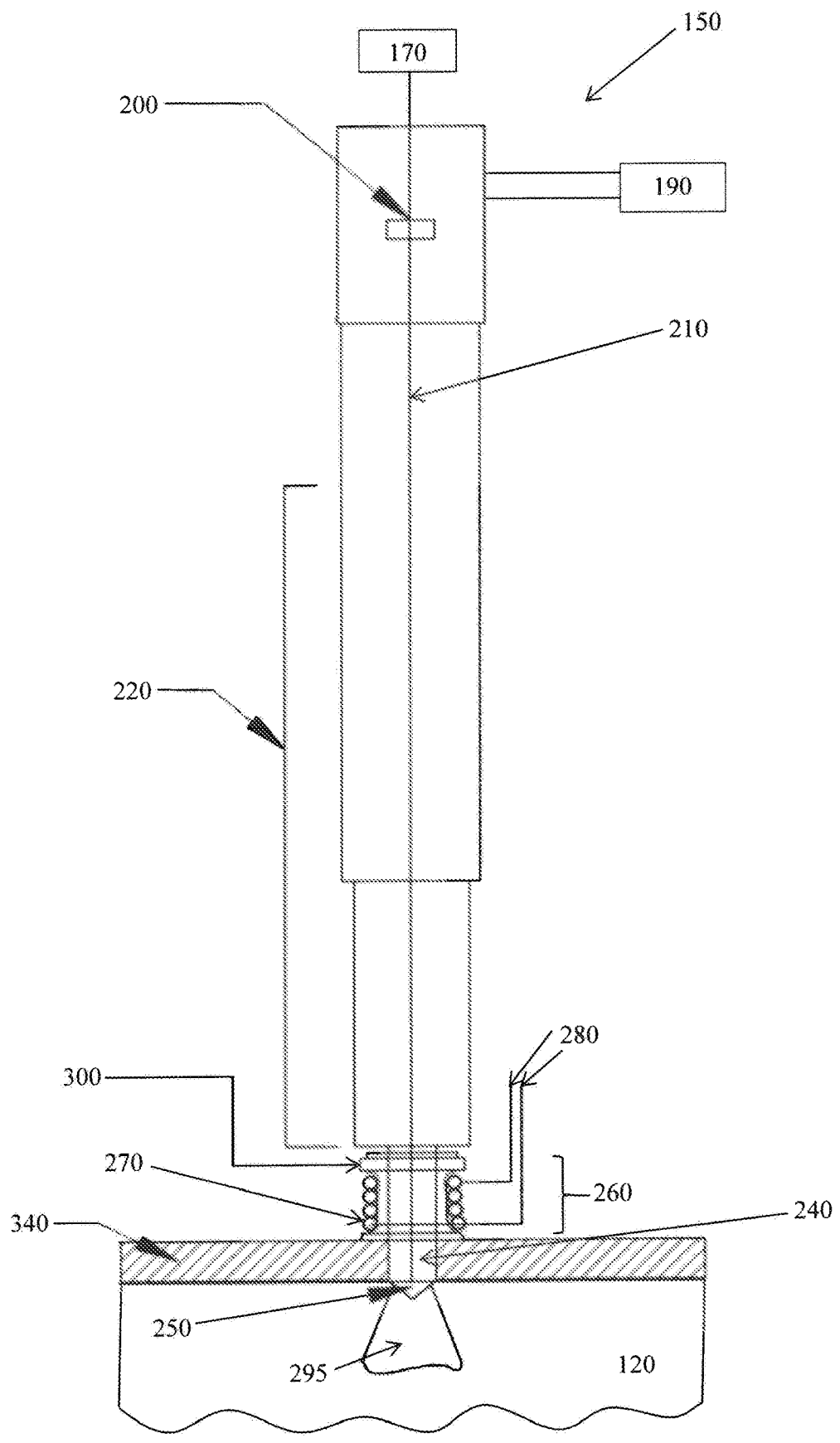
FIG. 2 illustrates a cross sectional view of a fuel injector having a heating apparatus according to an example embodiment.

FIG. 2 discloses an example embodiment of the fuel injector 150. The fuel injector 150 is fed fuel from the fuel rail 170 through a fuel port 200. The fuel port 200 is able to accept the fuel from the fuel rail 170 and allows the fuel to flow into a fuel passage 210 located within the interior of the fuel injector 150. The fuel injector 150 may have a fuel metering actuation section 220. The fuel metering actuation section 220 is located as part of an upper portion of the fuel injector 150. The fuel metering actuation section 220 feeds the fuel through the fuel injector 150 in response to commands issued from the control system 190, or electronic control unit, of the engine 100. These commands may take the form of electric signals. Based on the received electric signals, the fuel metering actuation section 220 forces fuel through the fuel passage 210 of the fuel injector 150 in an activation mode and ceases the passage of fuel through the fuel passage 210 of the fuel injector 150 in a recovery mode.

Nozzle 240 is located below (i.e., downstream from) the fuel metering actuation section 220. The nozzle 240 is formed from a conductive material such as a metal, which may be high-speed steel or other ferrous metals of the like. The nozzle 240 forms the bottom portion of the fuel injector 150. The nozzle 240 may include a nozzle body that culminates in a nozzle tip 250 at the nozzle exit, as shown by FIG. 2. The nozzle tip 250 may be tapered as shown by FIG. 2. Fuel entering through the fuel port 200 travels the length of the fuel passage 210 within the fuel injector 150 and into a continuation of the fuel passage 210 traveling through the nozzle 240. Fuel then exits the nozzle 240 through the nozzle tip 250 located at the bottom end of the nozzle 240.

An electromagnetic inductor 260 circumferentially envelops the nozzle 240. In an example embodiment, the inductor 260 circumferentially envelops an outer surface of at least a portion of the nozzle 240. As shown by FIG. 2, this portion may be an upper portion of the nozzle body that does not extend into the ignition cylinder 120. The electromagnetic inductor 260 is inductively cooperative with the nozzle 240 as described below. In an example embodiment, the electromagnetic inductor may take the form of a conductive coil 270 that is wrapped around an outer surface of at least a portion of the nozzle 240 (e.g., an upper portion of the nozzle body). The coil 270 may include a number of turns sufficient to provide adequate inductive heating effects as described herein, subject to the available spacing constraints of the system. As an example, the coil 270 can take the form of a 4-turn coil. The coil 270 can be connected with a variable current source via a pair of wires 280. Example embodiments of circuitry that may serve as such a variable current source are described below.

As the variable current flows through the conductive coil 270 that is wrapped around at least part of the outer surface of the nozzle 240, electromagnetic forces act upon the nozzle 240. These electromagnetic forces cause the formation of eddy currents which travel through the nozzle 240 itself. The resulting eddy currents generate a buildup of heat within the metallic material of the nozzle 240. This heating of the nozzle 240 in turn heats the fuel traveling along the fuel passage 210 within the nozzle 240. As a result of this inductive heating, the fuel can be heated to a point of autoignition, so that when the heated fuel 295 exits the nozzle 240 via nozzle tip 250, the fuel combusts to provide energy for operation of the engine 100.

The nozzle tip 250 may protrude through a cylinder head base 340 of the ignition cylinder head 160 and into the ignition cylinder 120 itself. The inductively heated nozzle 240 can heat fuel 295 to a temperature point where autoignition by compression can occur. This type of combustion can occur without the aid of a conflagrant such as but not limited to spark plugs commonly used in a majority of internal combustion engines.

An insulator 300 can be positioned between the conductive coil 270 and the nozzle 240. The insulator 300 may be shaped and positioned to prevent contact of the conductive coil 270 with the nozzle 240.

Figure 3:
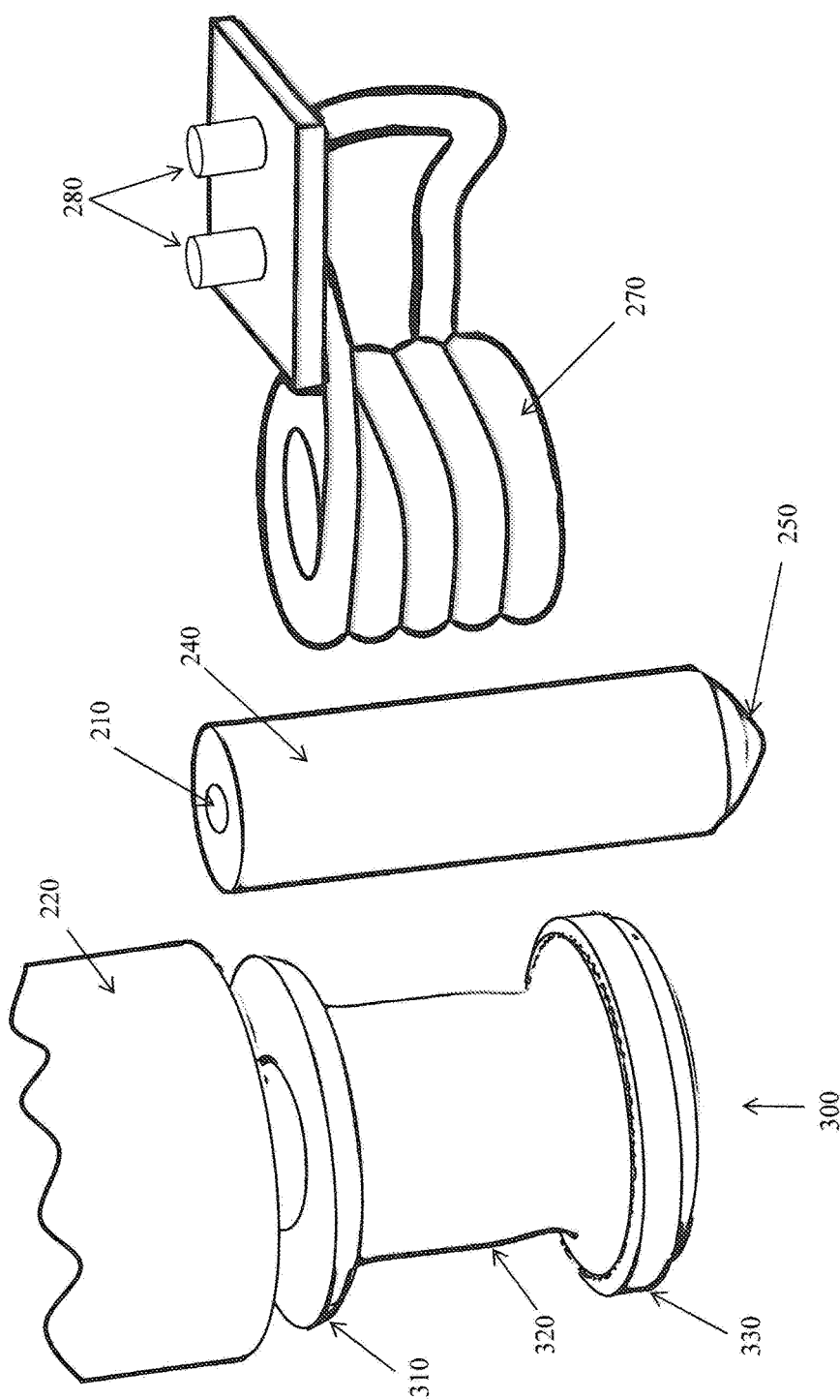
FIG. 3 illustrates a deconstructed view of an example embodiment of heating apparatus.

FIG. 3 shows a deconstructed view of the heating apparatus, including views of the coil 270, nozzle 240, and insulator 300. Also shown is a portion of the fuel actuation metering section 220. The insulator 300 shall be shaped and positioned to prevent contact between the conductive coil 270 and the nozzle 240. In an example embodiment, the insulator 300 may take on a manufactured shape similar to that of a spool of thread. An insulator top portion 310 may have a larger diameter than an insulator middle portion 320. The larger diameter of the insulator top portion 310 is fashioned to inclusively accommodate at least a diametric width of the conductive coil 270, so as to prevent physical contact between the conductive coil 270 and the shoulder of the fuel injector that exists at the transition from the fuel metering actuation section 220 to the nozzle 240. Furthermore, the insulator top portion 310 may extend beyond the diametric width of the conductive coil 270 to provide lateral protection to the protruding interior chambers of the ignition cylinder head 160 which surround the fuel injector 150. Additionally, an insulator bottom portion 330 may have a larger diameter than the insulator middle portion 320. The larger diameter of the insulator bottom portion 330 is also fashioned to inclusively accommodate at least the diametric width of the conduction coil 270 so as to prevent physical contact between the conductive coil 270 and the cylinder head base 340. Like the insulator top portion 310, the insulator bottom portion 330 may extend beyond the diametric width of the conductive coil 270 to provide lateral protection to the protruding interior chambers of the ignition cylinder head 160 and the cylinder head base 340 which surround the fuel injector 150.

The insulator 300 protects the nozzle 240, fuel metering actuation section 220, ignition cylinder head 160, and the cylinder head base 340 from the conductive coil 270. This protection can take the form of heat protection and electrical protection.

For example, because the insulator 300 physically separates the coil 270 from the nozzle 240 and other fuel injector and engine components, conductive heat transfer from the nozzle 240 to such components is minimized. In an example embodiment, the nozzle 240 is inductively heated via the eddy currents induced therein by the variable current passing through the coil, and the insulator 300 prevents any significant conductive heating of the coil 270 by the nozzle 240. To facilitate this protective element, the insulator 300 may be manufactured from a heat resistant material. In an example embodiment of operational conditions, the temperature within the nozzle 240 may rise to or above 800 degrees Fahrenheit. In comparison, the operational temperature within the coil 270 may be around 180 degrees Fahrenheit. The insulator 300 functions to thermally protect the coil 270 from the nozzle 240 as the large differential of heat between the two components exists within a confined spatial region of the ignition cylinder head 160.

Secondly, the insulator 300 provides electrical protection between the conductive coil 270 and the nozzle 240, fuel metering actuation section 220, ignition cylinder head 160, and the cylinder head base 340. The insulator 300 in this regard may be an electrical bushing. The insulator 300 provides a physical barrier to prohibit the inadvertent transfer of variable current into either the nozzle 240, fuel metering actuation portion 220, ignition cylinder head 160, or cylinder head base 340 by direct physical contact. While protecting components in this fashion, the insulator 300 also allows electromagnetic waves given off from the passage of the variable current through the coil 270 to pass through the insulator 300 and thereby induce the needed eddy currents onto the nozzle 240.

Figure 4:
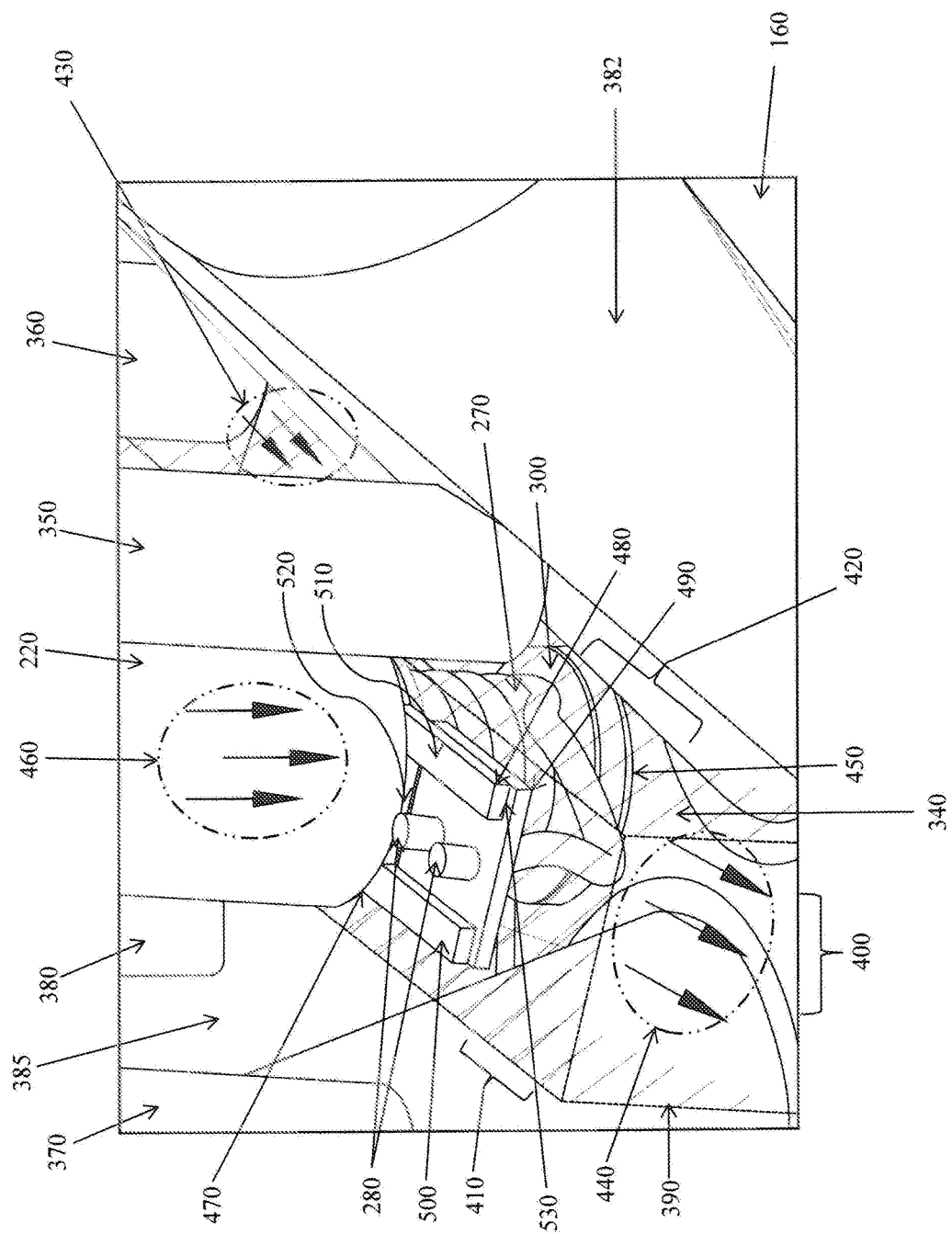
FIG. 4 illustrates an enlarged view of the fuel injector nozzle with the heating apparatus and a coolant passage according to an example embodiment.

FIG. 4 shows an enhanced view of the coil 270 and nozzle 240 in an example embodiment. At least four valve guides (350, 360, 370, 380) surround the fuel injector 150. The at least four valve guides (350, 360, 370, 380) aid in positioning of the intake valve (not shown) and the exhaust valve (not shown) in a straight path within the ports toward the ignition cylinder 120.

A coolant passage 390 is formed above, around, and through the location where nozzle 240 enters the ignition cylinder 120. The physical dimensions of the coolant passage 390 are dependent on the physical structure and design of the ignition cylinder head 160. The coolant passage 390 will usually have a lower boundary 400 determined by the physical surface of the cylinder head base 340. A first side boundary 410 and a second side boundary 420 may create the side walls of the coolant passage 390. The first and second side boundaries (410 and 420) are determined by the physical contour of portions of the ignition cylinder head 160. As viewed in FIG. 4, the first side boundary 410 and the second side boundary 420 each have an a varied configuration. Parts of first and second side boundaries (410 and 420) may have a semicircular shape where the boundaries conform to the physical structure of the air intake port 382 and exhaust port 385, and a perpendicular shape relative to the cylinder head base 340 where the first and second side boundaries (410 and 420) are not confined by the air intake port 382 and exhaust port 385. Furthermore, the coolant passage 390 may have a top boundary (not shown) to contain a coolant within the coolant passage 390. The top boundary may be made of the same metal or semi-metal alloy used for manufacture of the engine block 110 and the ignition cylinder head 160. Moreover, the top boundary (not shown) may be machined in such a way as to adequately seal the coolant within the coolant passage 390 and have an opening through which the pair of wires 280 connected to the coil 270 may pass. Furthermore, the top boundary (not shown) may be machined to configure to the physical structure of the ignition cylinder head 160.

The coolant passage 390 may also include a coolant intake 430 located at a first end of the coolant passage 390 and a coolant exit 440 located at a second end of the coolant passage 390. The coolant intake 430 is operable to receive a coolant from an outside containment source (not shown), such as but not limited to other engine components or a reservoir, and flow the coolant through the coolant passage 390, across the coil 270 and toward the coolant exit 440. At the coolant exit 440, the coolant may leave the coolant passage 390 to travel to other engine components, a reservoir, or another outside machine system utilizing the coolant. If a plurality of ignition cylinders 120 are present, the coolant passage 390 may be configured to interconnect each of the coils 270 by the above described boundaries so that the coolant may flow over and through each of the coils 270. The coolant traveling through the coolant passage 390 may exhibit different matter states dependent on the design of the engine 100. In an example embodiment, the coolant may be an engine oil. The coolant may also be other types of liquid medium possessing an operative property to remove heat. In other embodiments that coolant may be air or a high volume gas stream capable of removing heat from the coil 270.

As the coolant moves through the coolant passage 390, the coolant contacts the conductive coil 270. The coolant is blocked from contacting the area where the nozzle 240 enters the ignition cylinder 120 by a bottom seal 450 formed by the contact of the insulator lower portion 330 contacting the cylinder head base 340. The bottom seal 450 is formed by exerting a downward force 460 onto the fuel injector 150 from the top. This downward force 460 may be an exerted pressure imparted by a retaining screw, a spring coil, or any other similar type of hardware normally used to secure the fuel injector 150 into the cylinder head base 340. The bottom seal 450 formed between the insulator 300 and the cylinder head base 340 prevents leakage of the coolant from the coolant passage 390 into the ignition cylinder 120 of the engine 100.

Similarly, a top seal 470 may be formed below the fuel metering actuation section 220. To aid in forming the top seal 470, a securing fork 480 may be used. The securing fork 480 may be placed around the nozzle 240 of the fuel injector 150 and positionally located between the insulator upper portion 310 and the fuel metering actuation section 220. The top seal 470, like the bottom seal 450, is formed by exerting the downward force 460 onto the top of the fuel injector 150. This downward force 460 may be an exerted pressure imparted by a retaining screw, a spring coil, or any other similar type of hardware normally used to secure the fuel injector 150 into the cylinder head base 340. The top seal 470 formed between the securing fork 480 and the fuel metering actuation section 220 prevents a leakage of coolant from the coolant passage 390 to outside engine components.

As the coolant contacts the conductive coil 270, the coolant effectively removes a buildup of heat within the conductive coil 270 caused by the passage of the variable current. This allows the conductive coil 270 to receive large amperes of the variable current for quick or controlled heating of the nozzle 240.

To provide the variable current to the conductive coil 270, a pair of wires 280 connect the conductive coil 270 to a variable current source. In an example embodiment, the pair of wires 280 travel off of the conductive coil 270 and into the coolant passage 390 before turning upwards to pass through a ceramic plate 490. After passing through the ceramic plate 490, the pair of wires 280 connect to the variable current source providing the variable current to the conductive coil 270. The ceramic plate 490 may be made from an insulating material.

When the securing fork 480 is placed around the nozzle 240 of the fuel injector 150 and slid into contact with the fuel metering actuation section 220, the securing fork 480 can rotate around the fuel injector 150 for proper placement in relation to the conductive coil 270. The securing fork 480 in an example embodiment may be located in parallel with the flow direction of the coolant passage 390. The ceramic plate 490 may then be placed below a first prong 500 and a second prong 510 of the securing fork 480 which extends radially outward from the nozzle 240. As the ceramic plate 490 is placed in such a position, the ceramic plate 490 contacts both the first and second prong (500 and 510) of the securing fork 480 as well as a middle connection 520 of the securing fork 480 located between the first and second prongs (500 and 510). The ceramic plate 490 may be affixed to the securing fork 480 by a fastening agent, such as an adhesive or the like, or by downward force 460 exerting pressure imparted by a retaining screw, a spring coil, or any other similar type of hardware, to secure the ceramic plate 490 to the securing fork 480. The fastening agent creates a securing fork seal 530 between the ceramic plate 490 and the securing fork 480 so that coolant from the coolant passage 390 may not leak out through gaps in the physical contact between the securing fork 480 and the ceramic plate 490 and onto outside engine components.

Figure 5:
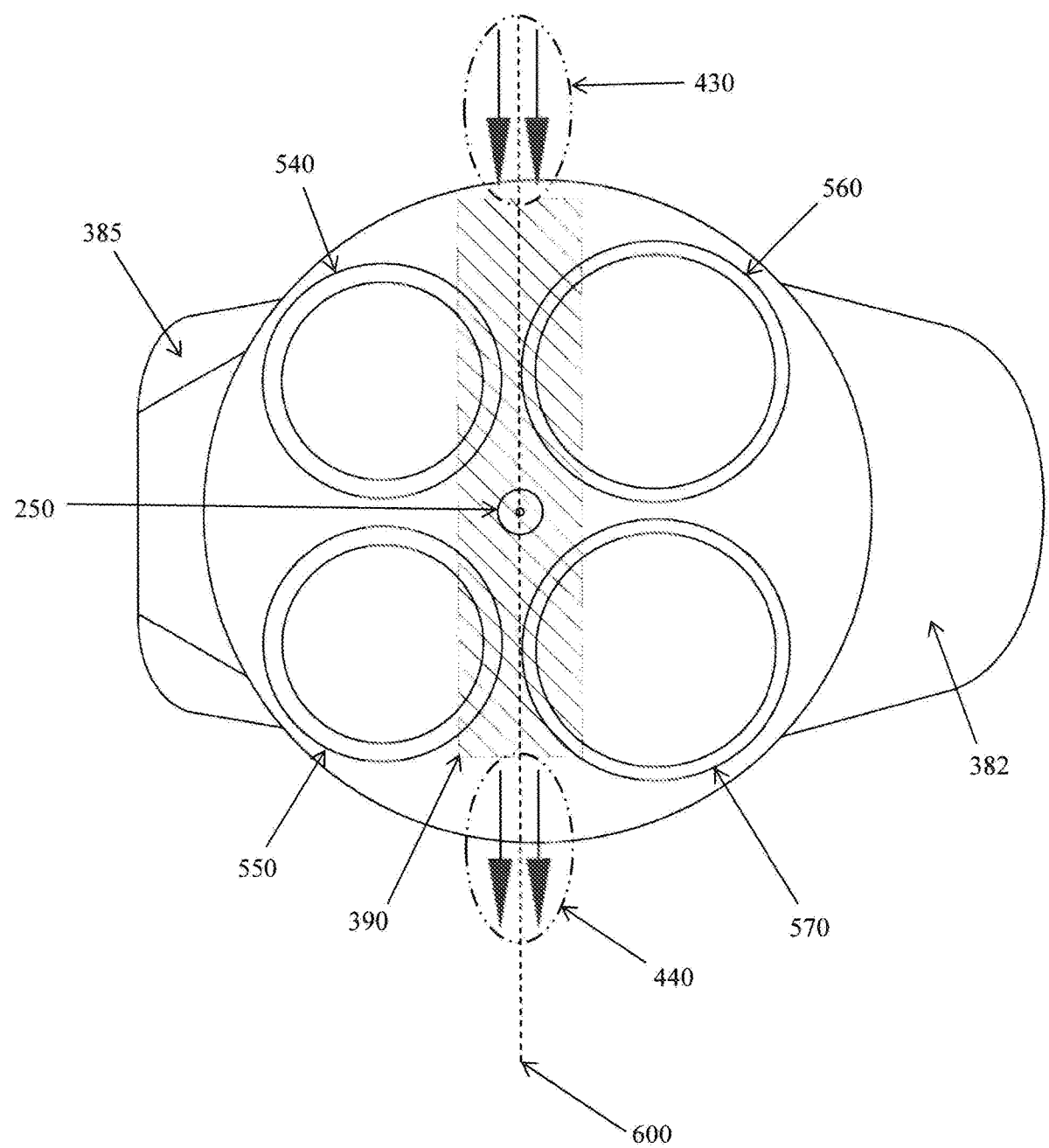
FIG. 5 illustrates a bottom view of the cylinder head base from within the ignition cylinder according to an example embodiment.

FIG. 5 is a bottom view of the cylinder head base 340 as seen from inside the ignition cylinder 120. The nozzle tip 250 extending into the center of the ignition cylinder 120 can be seen protruding into the center of the cylinder head base 340. Surrounding the nozzle tip 250 are a plurality of valve seats (540, 550, 560, 570). Above each of the plurality of valve seats (540, 550, 560, 570), a valve (not shown) may be present running up through each of the at least four valve guides (350, 360, 370, 380) and connecting to a cam or camshaft (not shown). Rotation of the cam or camshaft (not shown) provides force upon a tappet or another actuation mechanism to actuate the valves (not shown) above the plurality of valve seats (540, 550, 560, 570) to open and close access to the interior of the ignition cylinder 120. The plurality of valve seats (540, 550, 560, 570) may encompass a first pair of valve seats 560 and 570 on one side of the cylinder head base 340 and a second pair of valve seats 540 and 550 on the other side of the cylinder head base 340. The first pair of valve seats 560 and 570 may connect to the air intake port 382. The air intake port 382 allows entry of outside ambient air into the engine 100. The air within the air intake port 382 travels through the first pair of valve seats 560 and 570 and into the interior of the ignition cylinder 120. Within the ignition cylinder 120, the air along with the heated fuel 295 from the fuel injector 150 mix for combustion to occur thereby powering the engine 100. Actuation from the cam or camshaft (not shown) on the valve (not shown) operates to open the seal between the valve and the first pair of valve seats 560 and 570 allowing air to enter through the air intake port 382 and into the ignition cylinder 120. Then actuation of the valve may occur in the opposite direction to close the seal between the valve and the first pair of valve seats 560 and 570 effectively closing the air intake port 382 during combustion within the ignition cylinder 120. This cycle is repeated numerous times at a high rate of repetition for proper operation of the engine 100.

Opposite the first pair of valve seats 560 and 570, the second pair of valve seats 540 and 550 connect to the exhaust port 385. The exhaust port 385 allows the exhaust contained within the ignition cylinder 120 after combustion to leave the ignition cylinder 120. The second pair of valves seats 540 and 550, in conjunction with actuation of the valves attached to the cam or camshaft, operate to close the seal between the valves and the second pair of valve seats 540 and 550. Then the seal between the second pair of valve seats 540 and 550 and the corresponding valves remains closed during the combustion phase within the ignition cylinder 120. The seal then releases after combustion to release the exhaust into the exhaust port 385. The second pair of valve seats 540 and 550, like the first pair of valve seats 560 and 570, operate this cycle numerous times and at a high rate of repetition to ensure proper operation of the engine 100. The seals created by the first pair of valve seats (560, 570) and the second pair of valve seats (540, 550) are opened and closed based on the actuation of the valves attached to the cam or camshaft. The lobe profile and phasing of the camshaft determines when the valves may be open or closed. In some embodiments of engine operation, it may be possible that all the seals created by the first and second pair of valve seats (540, 550, 560, 570) and their respective valves may be open. However, traditional engine operation rotates the opening and closing of the valves in a predefined sequence allowing air to enter the ignition cylinder 120, combustion to occur, and then allowing the exhaust to exit the ignition cylinder 120.

Still referring to FIG. 5, the coolant passage 390 may be viewed. From this perspective view within the ignition cylinder 120, the coolant passage 390 is located on the opposite side of the cylinder head base 340. The above-described seals would prevent coolant flowing through the coolant passage 390 from leaking into the ignition cylinder 120 to inhibit or contaminate the combustion cycle. The coolant passage 390 may be positioned parallel to an axis 600 of the cylinder head base 340. The coolant passage 390 may have an adequate horizontal width to encompass the electromagnetic inductor 260 located around the nozzle 240 and behind the nozzle tip 250 in this perspective view. The flow of the coolant passage 390 is relative to the configuration of the engine 100 and whether or not a plurality of fuel injectors 160 are present. However, the coolant will generally flow along the coolant passage 390 from the coolant intake 430 to the coolant exit 440.

Figure 6:
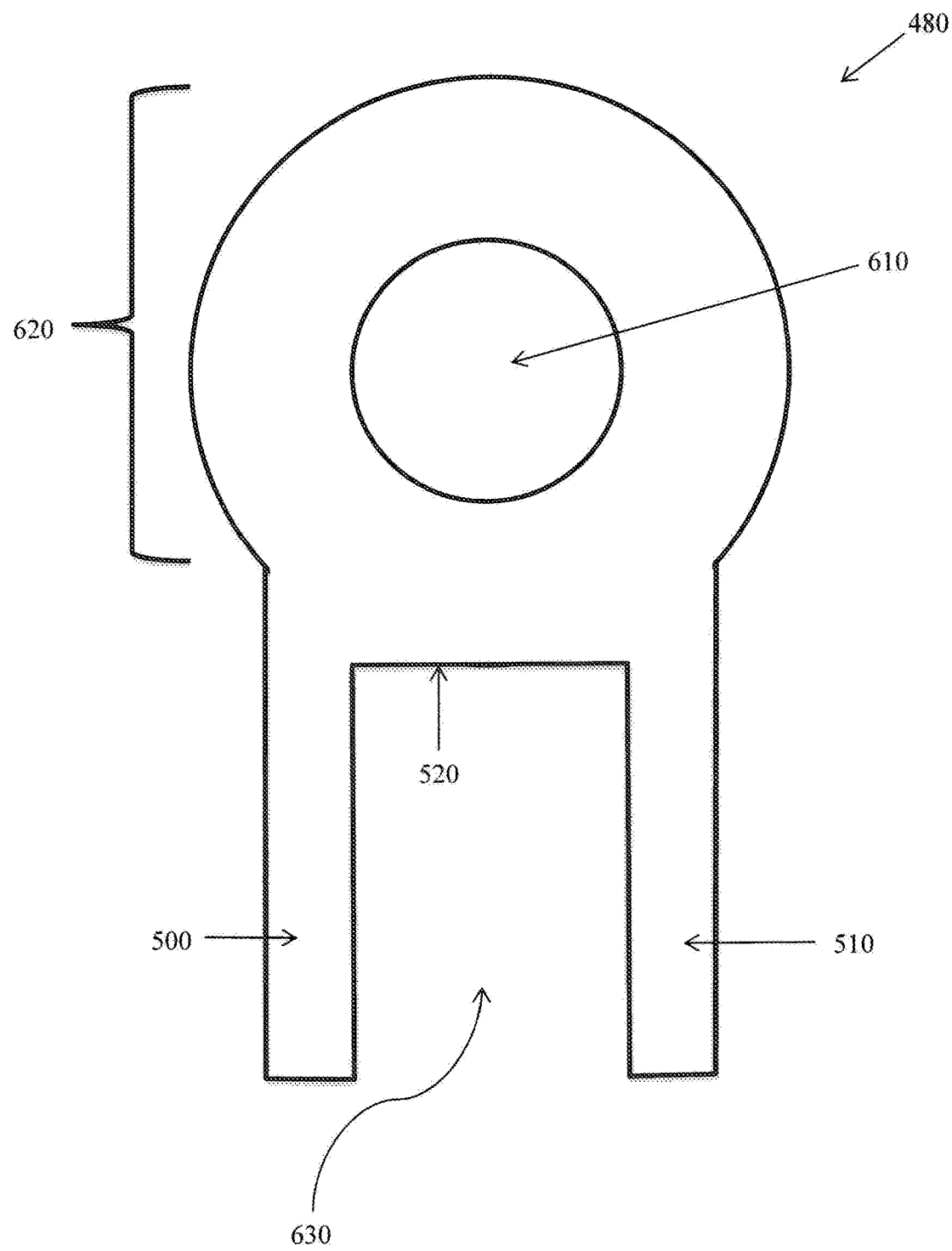
FIG. 6 illustrates a view of a securing fork used within the heating apparatus according to an example embodiment.

FIG. 6 is a view of the securing fork 480 when not connected to the fuel injector 150. The securing fork 480 may be constructed from a heat resistant, strong, metal or metallic alloy such as but not limited to steel. The material used in the manufacture of the securing fork 480 should be of substantive strength and rigidness to withstand engine conditions resulting in harsh vibrations and operation of the machine. These vibrations can occur from normal or intense engine operation as well as the machine passing over and through uneven terrain or bumpy environments for extended lengths of time. In other example embodiments, the securing fork 480 may be made of a strong ceramic material. The depth of the securing fork 480 is dictated by engine design and material strength such that securing fork 480 may adequately fit onto the fuel injector 150 and hold down the ceramic plate 490, which may accept the pair of wires 280 running from the conductive coil 270. Regardless of the composite material of the securing fork 480, the securing fork 480 may be manufactured to have a central void 610. The central void 610 may be a circle having a central diameter equal to the size of the nozzle 240 as to slidably fit over the nozzle tip 250 and nozzle 240 of the fuel injector 150. The upper area of the securing fork 480 includes a circular region 620, where the circular region 620 may have a total diameter equal to or greater than the diameter of the fuel metering actuation section 220. Through such sizing, the securing fork 480 can properly contact the entirety of the fuel metering actuation section 220 and the insulator 300 to provide the top seal 470 needed to prevent leakage of the coolant. The lower portion of the circular region may be squared off by the middle connection 520 connecting the first and second prongs (500, 510) of the securing fork 480. The first and second prongs (500, 510) of the securing fork 480 are attached to the middle connection 520 and positioned radially outward as well as parallel to the axis 600. Such a configuration of the securing fork 480 allows for a plating void zone 630 located between the two prongs (500, 510) and below the middle connection 520. The plating void zone 630 may be manufactured and configured to receive the ceramic plate 490 to be affixed to the securing fork 480 during assembly of the electromagnetic inductor 260.

Figure 7:
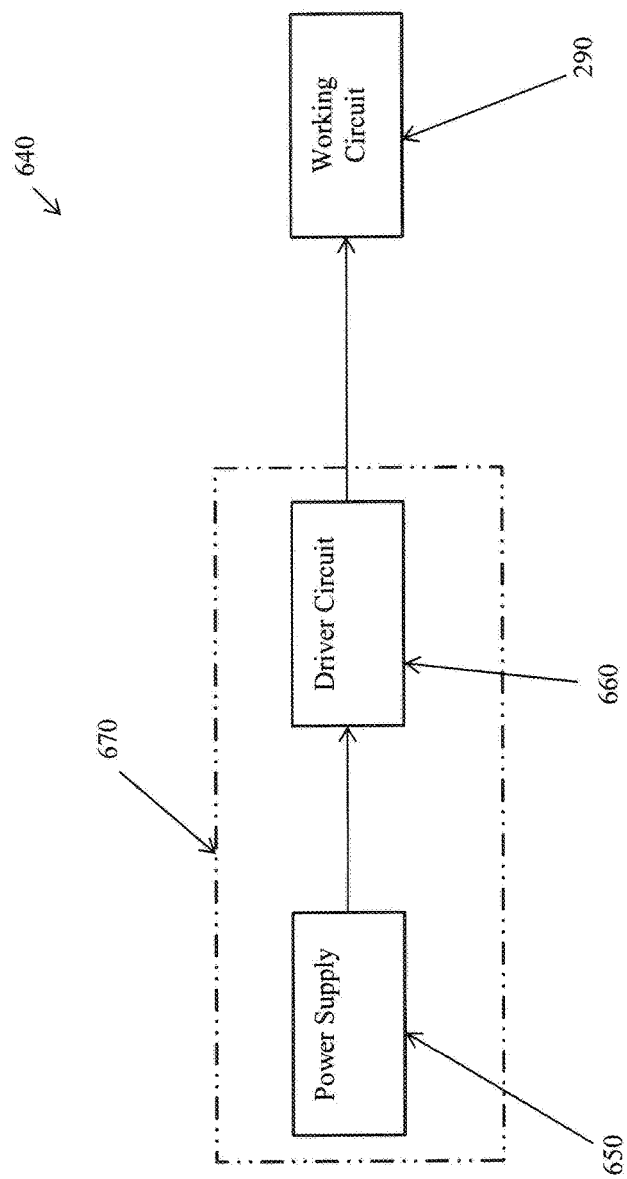
FIG. 7 illustrates a system diagram for an example electrical operation structure of the heating apparatus according to an example embodiment.

FIG. 7 illustrates an example system diagram for electrical operation of the heating apparatus according to an example embodiment. In this example embodiment, the heating apparatus 640 may be categorized into three interconnected circuits. A power supply circuit 650 interconnected with a driver circuit 660 form the bulk of the power electronics circuitry 670 used within the heating apparatus 640. The driver circuit 660 in turn interconnects with a working circuit 290, where the working circuit 290 includes the coil 270. The functionality and electronic design of each of these elements will now be described in greater detail.

Figure 8A:
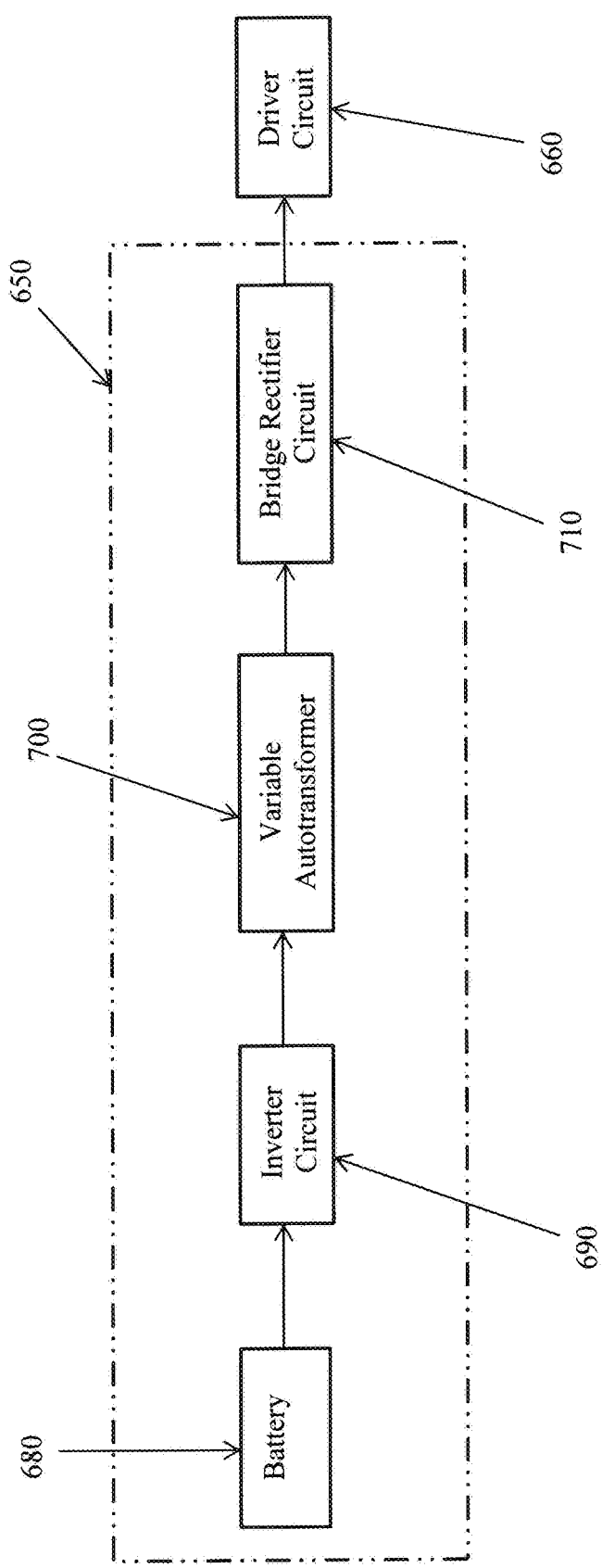
FIG. 8A illustrates an example embodiment of the power electronics circuitry shown in FIG. 7.

FIG. 8A discloses an example embodiment of the power electronics circuitry 670. The power supply circuit 650 may comprise a single component or a combination of the multiple components dependent upon the structure of the machine or engine 100 utilizing the heating apparatus 640. In an example embodiment, a battery 680 may be used to provide power to the heating apparatus 640. As an example, the battery 680 may be a 12 volt battery commonly utilized in on-highway vehicles and other machines.

The battery 680 may provide a flow of direct current based on the voltage of the battery 680 to an inverter circuit 690. The inverter circuit 690 is configured to receive the direct current from the battery 680 through an electrical connection and convert the direct current into an alternating current. As an example, 12 volts of direct current provided by the battery 680 may be converted into 120 volts of alternating current at 60 cycles per second. The alternating current produced by the inverter circuit 690 may then travel through an electrical connection into a variable autotransformer 700. The variable autotransformer 700 allows the voltage of alternative current from the inverter circuit 690 to be adjusted based on the needs of the working circuit 290.

The driver circuit 660 is designed to drive the high frequency variable current circulating through the working circuit 290 and the conductive coil 270. To drive this variable current, the driver circuit 660 may transmit an adjustable voltage dependent on the needs of working circuit 290 and conductive coil 270. The variable transformer 700 fills the adjustable needs of both the driver circuit 660 and the working circuit 290. If more heating is needed, the variable autotransformer 700 can provide a higher voltage to the driver circuit 660 to increase the variable current within the working circuit 290. This in turn will result in the induction of more heat on the nozzle 240. The opposite may be true as well. If less heating is needed, the variable autotransformer 700 may provide a lower voltage to the driver circuit 660 to decrease the variable current within the working circuit 290 and in turn decrease the inductive heating of the nozzle 240. In an example embodiment, the variable autotransformer 700 may produce a range of voltage inclusive of 0 to 353 volts peak to peak ($V_{pp}$) and 0 to 250 volts root mean squared ($V_{rms}$). With such a range, the variable autotransformer 700 can provide the higher voltages for increased heating power and the lower voltages for a heating decrease dependent on the needs of the working circuit 290, engine 100, or machine.

As the voltage of alternative current leaves the variable autotransformer 700, the voltage may enter a bridge rectifier circuit 710 through an electrical connection. The bridge rectifier circuit 710 reconverts the voltage of alternating current into a corresponding voltage of direct current. The voltage of direct current then flows through an electrical connection into the driver circuit 660 to power the driver circuit 660 of the heating apparatus 640.

Figure 8B:
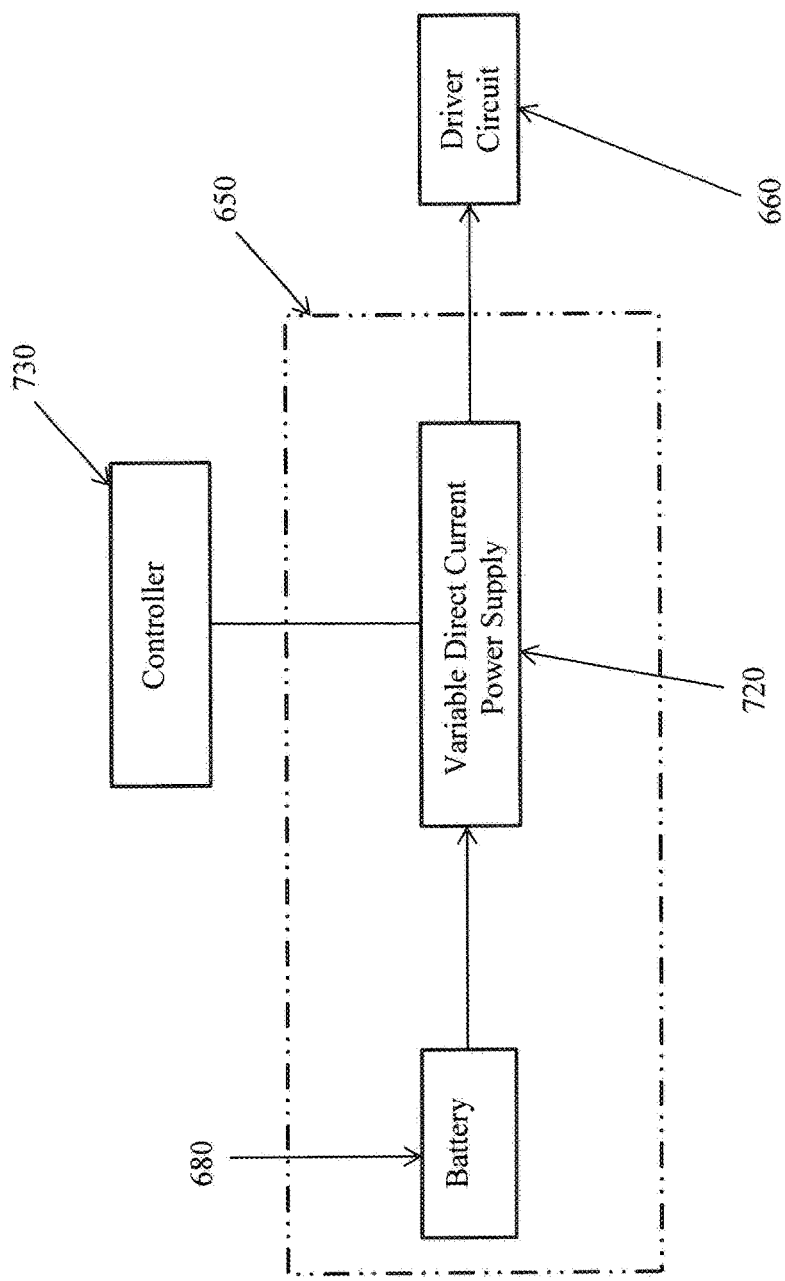
FIG. 8B illustrates another example embodiment of the power electronics circuitry shown in FIG. 7.

It should be understood that other designs for the power electronics circuitry 670 may be employed if desired by a practitioner. As an example, FIG. 8B illustrates another example embodiment of the power electronics circuitry 670. It is envisioned that in some machines and engines 100 having a more complex electrical system, a variable direct current power supply circuit 720 may be used to replace some of the above-discussed components. The variable direct current power supply circuit 720 may replace each the inverter circuit 690, variable autotransformer 700, and the bridge rectifier circuit 710. The variable direct current power supply circuit 720 may receive 12 volts of direct current from the battery 680. The variable direct current power supply circuit 720 may then adjust the voltage of the direct current into a range of 0 to 120 volts. The voltage leaving the variable direct current power supply circuit 720 remains as direct current and is not converted to alternating current within the variable direct current power supply circuit 720. To determine what voltage the variable direct current power supply circuit 720 will output, a controller 730 may be used. The controller 730 may be a computerized controller such as an electronic control unit present within a majority of machines and in communication with the engine 100 of the machine. The controller 730 may utilize a voltage algorithm to determine and adjust the output voltage from the variable direct current power supply circuit 720. In such embodiments, the controller 730 may determine that additional heating is needed, thereby determining with the voltage algorithm an output voltage corresponding to the desired amount of heating. In the same respect, if less heat is needed, the controller 730 may execute the voltage algorithm to determine an output voltage corresponding to the desired lower temperature. The output voltage of the variable direct current power supply circuit 720 electrically connects to the driver circuit 660 to power the driver circuit 660.

Figure 9:
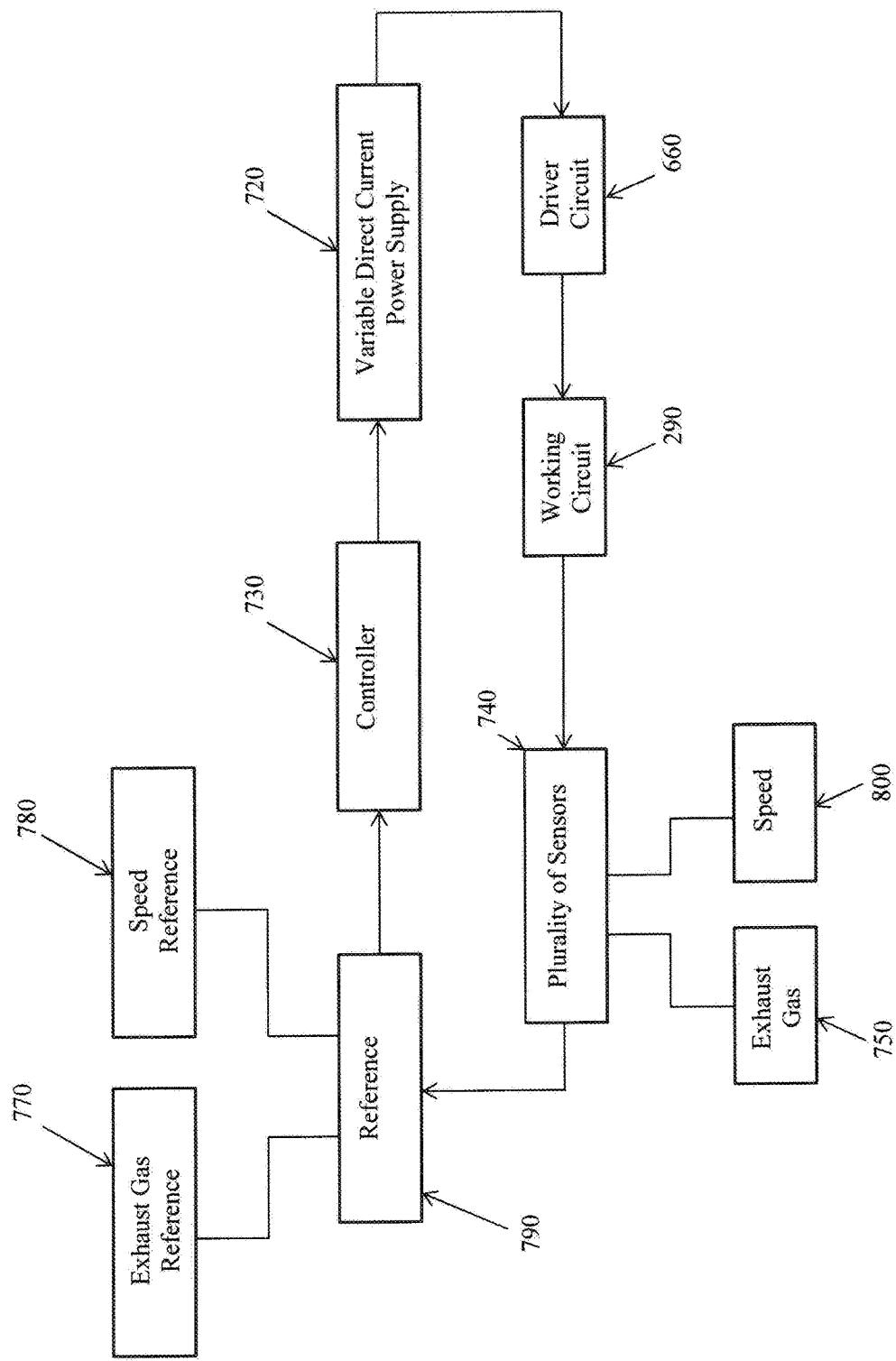
FIG. 9 illustrates an example system diagram for operational characteristics reported to a controller that can used with the heating apparatus in an example embodiment.

Referring now to FIG. 9, another example embodiment is shown wherein the controller 730 communicates with the variable direct current power supply circuit 720 to power the heating apparatus 640. As stated above, the controller 730 is in communication with the variable direct current power supply circuit 720 which communicates with the driver circuit 660. A voltage change directed by the controller 730 and executed by the variable direct current power supply circuit 720 produces the desired change in temperature within the heating apparatus 640. Accordingly, the heating apparatus 640 can produce more or less heat on the nozzle 240 depending on commands issued from the controller 730. This heating on the nozzle 240 may be optimized by the controller 730 dependent on variable information received by the controller 730.

A plurality of sensors 740 may exist throughout the machine and the engine 100. These sensors 740 may interconnect with the controller 730, or engine control unit in some embodiments, to provide real-time feedback concerning the operation of the engine 100 or the machine. In an example embodiment, an exhaust gas temperature sensor 750 may be present within the exhaust manifold (not shown) of the engine 100. The exhaust gas temperature sensor 750 may record and communicate an exhaust gas temperature of the gas leaving the ignition cylinder 120 after combustion has occurred. The exhaust gas temperature may be used by an algorithm of the controller 730 to determine any changes, such as an increase or decrease, in voltage needed for proper operation of the engine 100.

The exhaust gas temperature reading may be taken by sensor 750 and stored within the controller 730 for use within respective algorithmic processes. The exhaust gas temperature reading may be taken when the engine 100 is operating and combustion is continuously occurring within the engine 100. Furthermore, the controller 730 may access an exhaust gas temperature reference 770 stored within a reference memory 790 in communication with the controller 730. The exhaust gas temperature reference 770 provides optimal data points for the exhaust gas temperature reading when correct efficient combustion is occurring within the ignition cylinder 120. With the respective algorithms, the exhaust gas temperature reference 770 may be compared to the exhaust gas temperature reading determined by sensor 750. The algorithms may use this comparison to help in a determination of whether or not combustion within the ignition cylinder 120 is occurring at an optimal level. The controller 730 may then issue commands to the variable direct current power supply circuit 720 to either increase or decrease the output voltage to the driver circuit 660. In doing so, the comparison between the stored references and determined sensor reading allows the controller 730 to issue commands pertaining to variable heating of the heating apparatus 640 for prime performance and efficiency of the engine 100.

Furthermore a speed sensor 800 may be present. The speed sensor 800 may connect to a crankshaft of the engine 100. The speed sensor 800 may electronically report to the controller 730 a speed reading determined by the speed sensor 800. Unlike the exhaust gas temperature reading which is beneficial for determining efficient operation of the engine while continuous combustion is occurring, the speed reading is transmitted to the controller 730 to determine whether or not the engine 100 has started and turned over. If the speed reading measured is zero, the controller 730 may then determine that the engine 100 is not in operation or is not needed to be in operation. However, it the speed reading is still measured at zero and the controller 730 has received and startup command, the controller 730 would then command the variable direct current power supply circuit 720 to produce a high output voltage. The high output voltage received by the driver circuit 660 would lead to rapid heating within the nozzle 240 so that the fuel may reach an adequate combustion temperature. Once the engine 100 is running and continuous combustion is occurring, the exhaust gas temperature reading may retain priority over a speed reading in determining if optimal combustion is occurring within the engine 100.

However, the speed sensor 800 may still continue recording readings while the engine 100 is operational. The controller 730 may access a speed reference 780 stored within a reference memory 790 in communication with the controller 730. The speed reference 770 provides optimal data points for the speed reading of the machine corresponding to an operational combustion output occurring within the ignition cylinder 120. With respective algorithms, the speed reference 780 may be compared to the speed reading determined by speed sensor 800. The algorithms may use this comparison to help in a determination of whether or not combustion within the ignition cylinder 120 is occurring at an optimal level and whether or not is should be decreased or increased to adjust the power output of the engine 100. The controller 730 may then issue commands to the variable direct current power supply circuit 720 to either increase or decrease the output voltage to the driver circuit 660. In doing so, the comparison between the stored references and determined sensor reading allows the controller 730 to issue commands pertaining to variable heating of the heating apparatus 640 for prime performance and efficiency of the engine 100.

Figure 10:
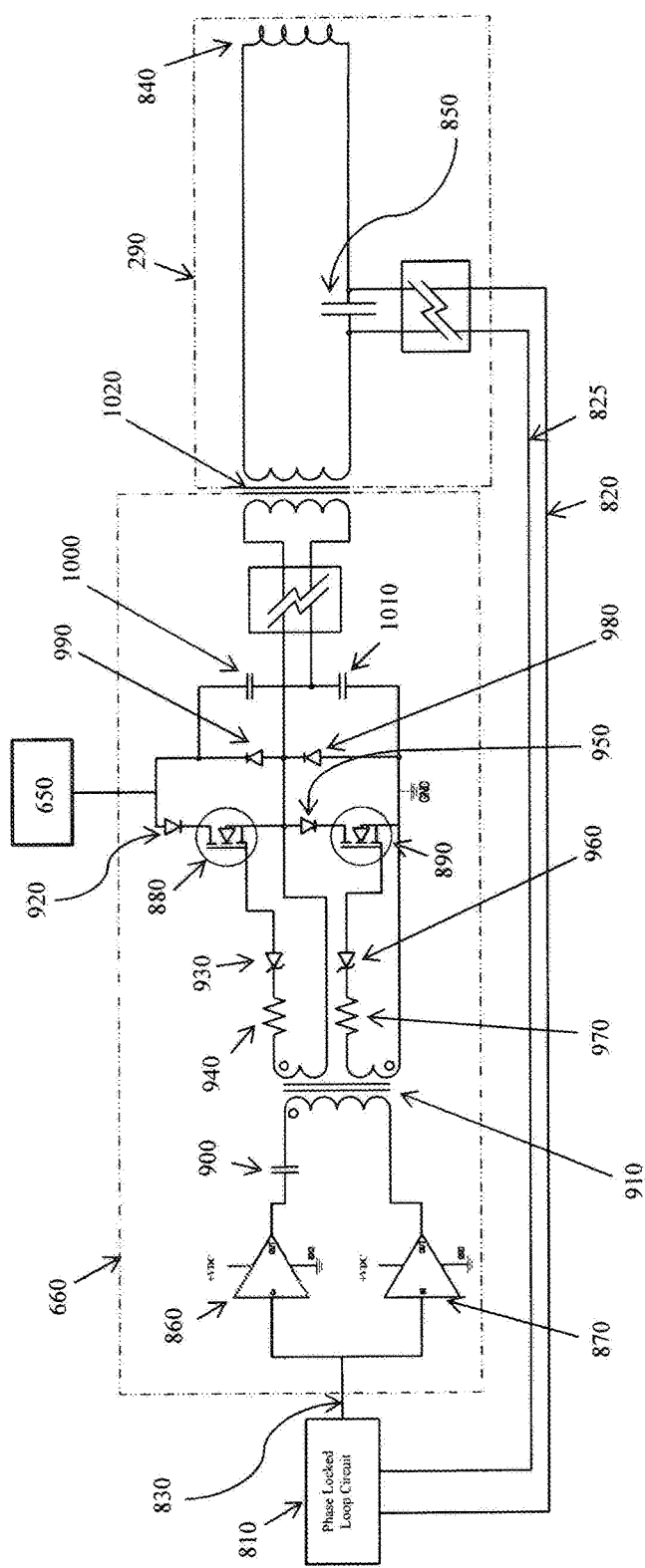
FIG. 10 illustrates an electrical schematic of an example driver circuit and the working circuit in an example embodiment.

FIG. 10 discloses an example embodiment of the driver circuit 660 along with the working circuit 290. The driver circuit 660 in this example includes a phase locked loop (PLL) circuit 810. In an example embodiment, the PLL circuit 810 may take the form of a powered microprocessor such as but not limited to a CMOS microprocessor. The PLL circuit 810 may receive a plurality of feedback inputs 820 and 825 from the working circuit 290 and produce a phase locked loop output 830.

Within the working circuit 290, the conductive coil 270 wraps around the nozzle 240 to form inductor 840. Furthermore a capacitor bank 850 is connected in series with the inductor 840 forming an LC circuit. The capacitor bank 850 may be a single capacitor or a plurality of capacitors. The size and design of the capacitor bank 850 may be dependent on the longevity requirement of the circuitry and the frequency of resonance created within the LC circuit. Physically, a first feedback input 820 connects to one side of the capacitor bank 850 while the second feedback input 825 connects to the other side of the capacitor bank 850. Together the capacitor bank 850 and the inductor 840 form a resonant system. The resonant system will have a resonant frequency which requires a small amount of power from the driver circuit 660 to continuously oscillate the variable current between the inductor 840 and the capacitor bank 850. It is the function of the PLL circuit 810 to identify this resonant frequency and "lock" onto it. As the nozzle 240 heats or cools within the inductor 840, the magnetic properties representing the relationship between the conductive coil 270 and the nozzle 240 change the resonant frequency of the working circuit 290. Therefore, the PLL circuit 810, through the plurality of feedback inputs 820 and 825, identifies and isolates whichever frequency within the LC circuit, configured from the capacitor bank 850 and inductor 840, is resonant and outputs the result.

The phase locked loop output 830 is a signal representing the identified resonant frequency within the working circuit 290. The phase locked loop output 830 connects to a pair of drivers 860 and 870. The pair of drivers 860 and 870 may be high current drivers capable of driving large MOSFETs. These drivers 860 and 870 may drive a pair of switching transistors 880 and 890 which may be large MOSFET chips based on the physical design and spatial constraints of the driver circuit 660. The phase locked loop output 830 ensures that the necessary frequency requirements are sent from the driver circuit 660 to the working circuit 290 to facilitate proper oscillation of the resonant frequency and heating of the nozzle 240.

A first driver 860 of the pair of drivers 860 and 870 may be a inverting MOSFET driver or the like which receives the phase locked loop output 830. The first driver 860 may receive a power of 15 volts of direct current in one embodiment of the present disclosure. Additionally, the voltage received by the first driver 860 may be grounded to a floating ground with is not a common earth ground. Attached to an output of the first driver 860, a first capacitor 900 may be present.

The second driver 870 of the pair of drivers 860 and 870 may be a non-inverting MOSFET driver or the like which also receives the phase locked loop output 830. The second driver 870 is located in parallel with the first driver 860. Like the first driver 860, the second driver 870 may receive a power of 15 volts of direct current in an example embodiment. Additionally, the second driver 870 may be grounded to the floating ground or the common earth ground. The connection between the output of the second driver 870 and the first capacitor 900 attached to the first driver 860 forms a primary side of a transformer 910 The transformer 910 may have a 1:1:1 ratio allowing for the transfer of electrical energy between the primary side connected to the pair of drivers 860 and 870 and a secondary side having a first and a second part. The first and second part of the secondary side exist as a pair of identical but opposite polarity outputs of the transformer 910 and each connect to the plurality of switching transistors 880 and 890.

The plurality of switching transistors 880 and 890 electronically connect to the power supply circuit 650. Dependent on the design of the driver circuit 660, the plurality of switching transistors 880 and 890 may receive voltage power from either the variable autotransformer 700 or the variable direct current power supply circuit 720 in different embodiments. This stage of the driver circuit 660 is responsible for determining when and how the voltage received by the power supply circuit 650 will power the working circuit 290. The voltage from the power supply circuit 650 may first pass through a first diode 920. The first diode 920 may be any type of diode which allows the electric current to flow from the power supply circuit 650 through the first diode's forward direction into a first switching transistor 880 of the plurality of switching transistors 880 and 890. The first switching transistor 880 may be a high voltage MOSFET transistor tailored for optimal switching performance with high voltage signals. Furthermore, the first switching transistor 880 may have an n-channel MOSFET configuration while in other circuitry designs and embodiments a p-channel MOSFET may be used. The first switching transistor 880 may have a second diode 930 in electrical communication with the gate of the first switching transistor 880. This second diode 930 may be a Zener diode or the like which would allow the current to flow in the reverse direction if the Zener voltage is reached. From there, the second diode 930 electronically connects to a first resistor 940 in series with the second diode 930 and the first switching transistor 880. The electrical circuitry leaving the first resistor 940 forms the a first part of the secondary side of the transformer 910 before returning to the drain of the first switching transistor 880.

Also attached to the drain of the first switching transistor 880 is a third diode 950. The third diode 950 may be any type of diode which allows the electric current to flow from the first switching transistor 880 or second stage of the three stage transformer 910 and through the third diode's forward direction into the second switching transistor 890 of the plurality of switching transistors 880 and 890. The second switching transistor 890, like the first switching transistor 880, may be a high voltage MOSFET transistor tailored for optimal switching performance with high voltage signals. Furthermore, the second switching transistor 890 may have an n-channel MOSFET configuration while in other circuitry designs and embodiments a p-channel MOSFET may be used. The second switching transistor 890 may have a fourth diode 960 in electrical communication with the gate of the second switching transistor 890. This fourth diode 960 may be a Zener diode or the like which would allow the current to flow in the reverse direction if the Zener voltage is reached. From there, the fourth diode 960 electronically connects to a second resistor 970 in series with the fourth diode 960 and the second switching transistor 890. The electrical circuitry leaving the second resistor 970 forms a second part of the secondary side of the transformer 910 before returning to the drain of the second switching transistor 890 and further connects to a common ground. The circuity of the second switching transistor 890 is located in parallel with the circuitry of the first switching transistor 880.

A fifth and a sixth diode 980 and 990 may also be present. The fifth diode 980 may be in parallel with the second switching transistor 890 and prevent a current flow between the drain of the first switching transistor 880 or the first part of the secondary side of the transformer 910 and the common ground. The sixth diode 990 may be in parallel with the first switching transistor 880 of the plurality of transistors 880 and 890. The sixth diode 990 may prevent the current flow from the power supply circuit 650 into the circuitry of the second switching transistor 890 without first passing through the circuity of the first switching transistor 880.

Additionally, a second and a third capacitor 1000 and 1010 may also be present within the driver circuit 660. The second capacitor 1000 may be located in parallel with the sixth diode 990 as well as the first switching transistor 880. Furthermore, the third capacitor 1010 may be located in parallel with the fifth diode 980 as well as the second switching transistor 890.

A coupling transformer 1020 may couple the driver circuit 660 with the working circuit 290. The coupling transformer 1020 may be configured as a step down transformer. The coupling transformer 1020 may have a first coil electrically connected to the first part of the secondary side of the transformer 910 as well as the second and third capacitors 1000 and 1010. The coupling transformer 1020 may include a high ratio of turns between the primary coil and the secondary coil of the coupling transformer 1020. In an example embodiment, the coupling transformer 1020 may have a ratio of 20:1 turns between the driver circuit 660 and the working circuit 290. This ratio may increase to 40:1 dependent on the needs of the driver circuit 660 and the working circuit 290. The reason these large ratios may be desirable pertains to the operation of the heating apparatus 640. The driver circuit 660, as stated above, operates by receiving a large voltage source form the power supply circuit 650. The first and second switching transistors 880 and 890 operate with this large voltage source, yet it is desirable that the current flow through the switching transistors 880 and 890 be minimal. To properly heat the nozzle 240 in many situations, a large amount of current should flow through the working circuit 290 in order to produce adequate eddy currents for heating. The coupling transformer 1020, using the high voltage source of the power supply circuit 650, induces the large variable current needed to heat the nozzle 240 in such situations. Dependent on how quickly the nozzle 240 must be heated or how continuous the heating needs to be, the voltage range of the driver circuit 660 may vary greatly. To accommodate this transfer into the large induced variable current, the ratio of coils with the coupling transformer 1020 may be altered to satisfy the design needs of the engine 100.

Within the working circuit 290, a single coil can be used as the secondary coil of the coupling transformer 1020. This single coil helps create the high step down ratio of the coupling transformer 1020, and in turn receives the induced variable current to flow through the working circuit 290. The coupling transformer 1020 is connected to the capacitor bank 850 and the inductor 840. Coil transformer shown by FIG. 10 is the representative electric circuitry equivalent of the conductive coil 270 wrapped around the nozzle 240. Like the coupling transformer 1020, the coil transformer may be a step down transformer. The primary coil of the coil transformer is the conductive coil 270. In an example embodiment, the conductive coil 270 may have four loops. However it should be understood that in other embodiments, more or fewer loops may be used for the conductive coil 270 dependent on the spatial constraints of the fuel injector 150 and the nozzle 240 within the engine 100. The nozzle 240 serves as the secondary coil of the coil transformer. Thus, in an example embodiment, the coil transformer may have a 4:1 ratio dependent on the structure and design of the fuel injector 150. As the variable current flows through the conductive coil 270, an induced current flows through the nozzle 240 as discussed above. That induced current, which may take the form of eddy currents, heats the nozzle 240 during operation of the heating apparatus 640.

Figure 11:
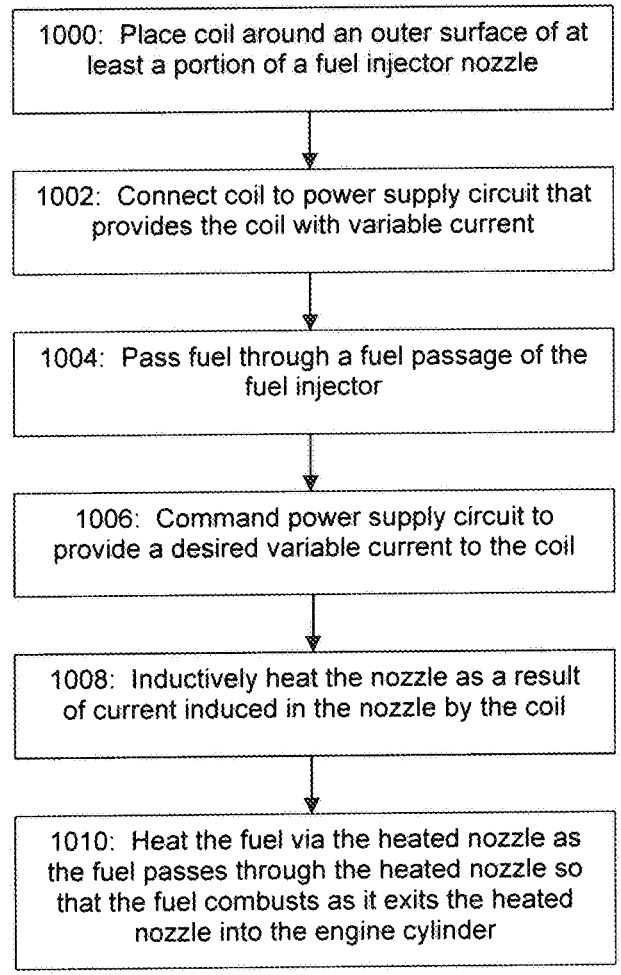
FIG. 11 illustrates a flow chart details a method of heating a fuel in accordance with an example embodiment.

Turning now to FIG. 11, a method of making and operating the heating apparatus 640 is disclosed. At step 1000, coil 270 is placed around an outer surface of at least a portion of the nozzle 240. At step 1002, the coil 270 is connected to a power supply circuit 650 that is able to provide the coil with variable current. These steps operate to make the heating apparatus 640. During operation, fuel flows through the fuel injector 150 (step 1004), and the power supply circuit 650 is commanded to provide a desired amount of variable current to the coil 270 (step 1006). It should be understood that feedback control can be used during operation of the engine 100 to adjust the amount of variable current provided to the coil 270, as explained above in connection with FIG. 9. The variable current through the coil 270 causes inductive heating of the nozzle 240 via current induced in the nozzle 240 by the coil 270 (step 1008). Thus, the heated nozzle 240 heats the fuel as the fuel passes through the heated nozzle 240 so that the fuel combusts as it exits the heated nozzle 240 into the ignition cylinder 120. Moreover, the inductively heated nozzle 240 can be used to heat the fuel to its autoignition temperature point. At such a temperature point, the fuel within the ignition cylinder 120 would be able to combust to provide operational power to the engine 100 without the aid of outside conflagrants such as a spark.

In view of the foregoing, it will be seen that the several advantages of the invention are achieved and attained. The disclosed heating apparatus and method in which a fuel is heated provides many improvements over other existing combustion methods. The disclosed heating apparatus provides precise heating of the fuel within a close proximity to the ignition cylinder. This allows for the fuel to travel a short distance with minimal heat loss as to maintain the necessary temperature for autoignition within the ignition cylinder. Furthermore, the disclosed heating apparatus provides acceptable heating for a multitude of different fuels used in engines. While this heating apparatus may be used to heat fuels such as natural gas and/or diesel fuel, the disclosed heating apparatus may also be used to heat fuels such as gasoline to an autoignition temperature within an engine. Gasolines, with varying levels of octane ratings, can be utilized with the disclosed heating apparatus. Gasoline fuels are traditionally combusted by engine with the aid of a spark or conflagrant. This is because a higher amount of applied energy is needed to initiate combustion of gasoline than for other fuels such as diesel. The amount of applied energy needed for combustion also increases as the octane level of the gasoline increases. Therefore, sparks, in the form of spark plugs, are commonly used to provide the necessary energy for combustion. By using the disclosed heating apparatus, gasoline fuel can be heated to an autoignition temperature such that the use of a spark is no longer necessary to compensate the energy needs. Therefore, sole compression based combustion of gasoline fuel is possible with use of the disclosed heating apparatus. Gasoline commonly used in both on highway and off highway vehicles may have an octane rating between 87 and 93. The disclosed heating apparatus can be operated to heat gasoline both inside and outside of this octane range for compression combustion without the aid of a spark. By using the disclosed heating apparatus, higher compression ratios may be obtained for combustion of the fuel within the engine environment. These higher compression ratios equate to a proportional increase of power output by the engine. By providing additional power through combustion of fuel in this manner, the engine operates at greater efficiency with the utilized fuel source. Furthermore, the disclosed heating apparatus is envisioned to be applicable universally among fuel sources. While envisioned to improve gasoline combustion by improving traditional engine designs, the disclosed heating apparatus may also be used with diesel, kerosene, natural gas, other variants of hydrocarbons, or any other combustible fuel source capable of being heated to an autoignition point for combustion. This diversity allow for the disclosed heating apparatus to be used in multiple operation environments and multiple industries, while allowing the user the flexibility of choosing fuel sources having a lower cost but meeting the power output demands of the desired work.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, values described for the operational electronic components regarding circuitry of the heating apparatus may be adjusted dependent on the necessary constraints of the engine. Additionally, coil ratios for the disclosed transformers of the present disclosure may also be adjusted dependent on the desires of the user and the engine requirements. Thus, the breadth and scope of the present invention should not be limited by any of the above-described exemplary embodiments, but should be defined only in accordance with the following claims appended hereto and their equivalents.

What is claimed is:

1. A fuel heating apparatus for an internal combustion engine, the apparatus comprising:
   a fuel injector having a nozzle, wherein the nozzle includes a flow passage for a fuel and a nozzle exit;
   a conductive coil that is wrapped around at least an outer surface of at least a portion of the nozzle, wherein the coil and the nozzle are inductively cooperative with each other such that the coil, in response to a variable current through the coil, is configured to induce a heating of the nozzle;
   a circuit in electrical cooperation with the coil, the circuit configured to (1) provide the variable current through the coil to thereby induce a current in the nozzle that causes the heating of the nozzle and (2) control the variable current through the coil so that (i) the heated nozzle heats the fuel to an autoignition temperature point as it flows toward the nozzle exit and (ii) the heated fuel combusts without aid of an outside conflagrant as it exits from the nozzle at the nozzle exit and enters an ignition cylinder of the internal combustion engine; and
   a coolant passage configured to provide a flow of a coolant to the coil to reduce a buildup of heat within the coil caused by the variable current through the coil.

2. The apparatus of claim 1, wherein the induced current comprises eddy currents.

3. The apparatus of claim 1, wherein the circuit is further configured to provide the variable current through the coil in an amount sufficient to induce the heating of the nozzle to a point that causes the fuel to combust as it exits from the nozzle without the aid of a spark.

4. The apparatus of claim 1, further comprising an insulator positioned to electrically insulate the coil relative to the nozzle.

5. The apparatus of claim 4, wherein the insulator comprises an electrical bushing that is positioned around the nozzle and between the nozzle and the coil.

6. The apparatus of claim 1, further comprising an insulator positioned to thermally insulate the coil relative to the nozzle.

7. The apparatus of claim 1, wherein the fuel injector further comprises a fuel actuator located upstream from the nozzle with reference to a fuel flow direction for the fuel through the fuel injector;
   wherein the nozzle further comprises a nozzle body and a nozzle tip, wherein the nozzle body and the nozzle tip are located downstream from the fuel actuator with reference to the fuel flow direction, and wherein the nozzle tip is located downstream from the nozzle body with reference to the fuel flow direction; and
   wherein the coil is wrapped around at least a portion of an outer surface of the nozzle body.

8. A method of heating fuel, the method comprising:
   inductively heating a nozzle of a fuel injector as a fuel flows through the nozzle to thereby heat the fuel, wherein the nozzle includes a nozzle exit, wherein inductively heating the nozzle comprises providing a varying current through a conductive coil that is wrapped around an outer surface of the nozzle, the varying current through the coil inducing a current in the nozzle that causes the inductive heating of the nozzle;

combusting the heated fuel, without aid of an outside conflagrant, as it exits from the nozzle at the nozzle exit and enters an ignition cylinder of an internal combustion engine by controlling the varying current through the coil so that the inductively heated nozzle heats the fuel to an autoignition temperature point as it flows toward the nozzle exit; and cooling the coil to reduce a buildup of heat within the coil caused by the varying current through the coil by providing a coolant to the coil via a coolant passage that is separated and sealed from a flow passage for the fuel.

9. The method of claim 8, further comprising:

the flowing fuel passing from a fuel actuator of the fuel injector into the nozzle of the fuel injector, the nozzle further including a nozzle body and a nozzle tip that extends into the ignition cylinder, the nozzle body being located upstream from the nozzle tip with reference to a direction of the flowing fuel, wherein the nozzle exit is located on the nozzle tip, and wherein the coil is wrapped around the nozzle body;

wherein inductively heating the nozzle comprises inductively heating the nozzle body via the coil; and wherein combusting the heated fuel comprises combusting the heated fuel flowing through the nozzle tip to create combustion in the ignition cylinder at the nozzle exit.

10. The method of claim 8, further comprising:
electrically insulating the coil relative to the nozzle.

11. An engine system, the system comprising:

a fuel injector having a nozzle, wherein the nozzle includes a flow passage for a fuel and a nozzle exit;

an ignition cylinder for an internal combustion engine, wherein at least a first portion of the nozzle protrudes into the ignition cylinder;

an electromagnetic inductor that circumferentially envelops at least a second portion of the nozzle;

a circuit configured to (1) provide a variable current through the electromagnetic inductor, wherein the variable current through the electromagnetic inductor induces a current in the nozzle that heats the nozzle and (2) control the variable current through the electromagnetic inductor so that (i) the heated nozzle heats the fuel to an autoignition temperature point as the heated fuel flows toward the nozzle exit and (ii) the heated fuel combusts in the ignition cylinder without aid of an outside conflagrant as it exits from the nozzle at the nozzle exit; and a coolant passage configured to provide a flow of a coolant to the electromagnetic inductor to reduce a buildup of heat within the electromagnetic inductor caused by the variable current through the electromagnetic inductor.

12. The system of claim 11, wherein the electromagnetic inductor comprises:

a conductive coil that circumferentially envelops at least the second portion of the nozzle.

13. The system of claim 12, wherein the coil and the nozzle form a step down transformer.

14. The system of claim 12, wherein the circuit further comprises a variable power supply.

15. The system of claim 12, further comprising:

at least one sensor configured to generate a signal indicative of an operational state for the internal combustion engine; and a computer in cooperation with the at least one sensor and the circuit, wherein the computer is configured to (1) compare an output from the at least one sensor with a reference value and (2) based on the comparison, determine an adjustment for the variable current to be delivered through to the coil, wherein the circuit is configured to deliver the adjusted variable current to the coil.

16. The system of claim 15, wherein the at least one sensor comprises an exhaust gas temperature sensor.

17. The system of claim 15, wherein the at least one sensor comprises a plurality of sensors, the plurality of sensors including (1) a speed sensor and (2) an exhaust gas temperature sensor;

wherein the computer is further configured to (1) determine whether the engine is running based on a comparison between the speed sensor output and a reference value associated with the speed sensor, (2) in response to a determination that the engine is not running, define a startup variable current for the coil, and (3) in response to a determination that the engine is running, adjust the variable current based on the output of the exhaust gas temperature sensor in relation to a reference value associated with the exhaust gas temperature sensor.

18. The system of claim 11, wherein the system does not include a spark plug.

19. The system of claim 11, wherein the nozzle further comprises:

a nozzle body that extends from a shoulder of an upper portion of the fuel injector; and a nozzle tip that extends into the ignition cylinder, wherein the nozzle exit is located on the nozzle tip, wherein the electromagnetic inductor includes a conductive coil wrapped around an outer surface of the nozzle body.

20. The system of claim 19, further comprising:

an electrical and thermal insulator that is positioned to separate the conductive coil from the nozzle body.

21. The system of claim 20, wherein the insulator comprises an annular member that surrounds the nozzle body, wherein the annular member has an upper portion, a middle portion, and a lower portion;

wherein the conductive coil wraps around the middle portion;

wherein the annular member has a wider diameter at its upper and lower portions than at its middle portion;

wherein the upper portion of the annular member separates the conductive coil from the shoulder of the upper portion of the fuel injector; and wherein the lower portion of the annular member separates the conductive coil from the ignition cylinder.

22. The system of claim 21, wherein the coolant passage is external to the fuel injector;

wherein the ignition cylinder includes an opening through which the nozzle tip and a portion of the nozzle body extend;

wherein the nozzle tip extends through the opening and into the ignition cylinder;

wherein the upper portion of the annular member provides a seal that prevents coolant from the coolant passage leaking into the upper portion of the fuel injector; and wherein the lower portion of the annular member engages with the ignition cylinder and provides a seal that prevents coolant from the coolant passage leaking into the opening.

23. The system of claim 22, further comprising:
a securing fork having (1) an opening through which the nozzle body extends, (2) a first prong, and (3) a second prong, wherein the securing fork is positioned between the upper portion of the annular member and the shoulder of the upper portion of the fuel injector to help define the seal that prevents coolant from the coolant passage leaking into the upper portion of the fuel injector, and wherein contacts to the conductive coil are provided through a recess between the first and second prongs.

24. The system of claim 22, wherein the ignition cylinder includes a cylinder head portion that engages with the lower portion of the annular member.

25. The apparatus of claim 1, wherein the nozzle further comprises:
a nozzle body that extends from a shoulder of an upper portion of the fuel injector; and
a nozzle tip that extends into the ignition cylinder, wherein the nozzle exit is located on the nozzle tip, wherein the conductive coil is wrapped around an outer surface of the nozzle body.

26. The apparatus of claim 25, further comprising:
an electrical and thermal insulator that is positioned to separate the conductive coil from the nozzle body.

27. The apparatus of claim 26, wherein the insulator comprises an annular member that surrounds the nozzle body, wherein the annular member has an upper portion, a middle portion, and a lower portion;
wherein the conductive coil wraps around the middle portion;
wherein the annular member has a wider diameter at its upper and lower portions than at its middle portion;
wherein the upper portion of the annular member separates the conductive coil from the shoulder of the upper portion of the fuel injector; and
wherein the lower portion of the annular member separates the conductive coil from the ignition cylinder.

28. The apparatus of claim 27, wherein the coolant passage is external to the fuel injector;
wherein the upper portion of the annular member provides a seal that prevents coolant from the coolant passage leaking into the upper portion of the fuel injector; and
wherein the lower portion of the annular member provides a seal that prevents coolant from the coolant passage leaking into an opening in the ignition cylinder.

29. The apparatus of claim 28, further comprising:
a securing fork having (1) an opening through which the nozzle body extends, (2) a first prong, and (3) a second prong, wherein the securing fork is positioned between the upper portion of the annular member and the shoulder of the upper portion of the fuel injector to help define the seal that prevents coolant from the coolant passage leaking into the upper portion of the fuel injector, and wherein contacts to the coil are provided through a recess between the first and second prongs.

30. The apparatus of claim 28, wherein the ignition cylinder includes a cylinder head portion that engages with the lower portion of the annular member.

31. The method of claim 8, wherein combusting the heated fuel comprises:
the heated fuel at the autoignition temperature point combusting as it exits the nozzle at the nozzle exit to create combustion in the ignition cylinder during a combustion phase for the ignition cylinder.

32. The apparatus of claim 1, wherein the circuit is configured to control the variable current through the coil so that the heated nozzle heats the fuel to the autoignition temperature point so that the heated fuel combusts at the nozzle exit during a combustion phase for the ignition cylinder.

33. The apparatus of claim 16, wherein the computer is further configured to (1) process exhaust gas temperature data from the exhaust gas temperature sensor to determine whether or not combustion within the ignition cylinder is occurring at a defined level and (2) control adjustments of the variable current to be delivered through the coil based on the determination as to whether or not combustion within the ignition cylinder is occurring at the defined level.

34. The system of claim 11, wherein the circuit is configured to control the variable current so that the heated nozzle heats the fuel to the autoignition temperature point so that the heated fuel combusts at the nozzle exit during a combustion phase for the ignition cylinder.

35. The apparatus of claim 1, wherein the circuit is further configured to control the variable current to create continuous combustion of the heated fuel at the nozzle exit.

36. The apparatus of claim 1, wherein the fuel is gasoline fuel, and wherein the circuit is further configured to control the variable current to combust the gasoline fuel at the nozzle exit.

37. The apparatus of claim 1, wherein the fuel is diesel fuel, and wherein the circuit is further configured to control the variable current to combust the diesel fuel at the nozzle exit.

38. The apparatus of claim 1, wherein the fuel is natural gas, and wherein the circuit is further configured to control the variable current to combust the natural gas at the nozzle exit.

39. The method of claim 8, wherein controlling the varying current comprises controlling the varying current to create continuous combustion of the heated fuel at the nozzle exit.

40. The method of claim 8, wherein the fuel is gasoline fuel.

41. The method of claim 8, wherein the fuel is diesel fuel.

42. The method of claim 8, wherein the fuel is natural gas.

43. The system of claim 11, wherein the circuit is further configured to control the variable current to create continuous combustion of the heated fuel at the nozzle exit.

44. The system of claim 11, wherein the fuel is gasoline fuel, and wherein the circuit is further configured to control the variable current to combust the gasoline fuel at the nozzle exit.

45. The system of claim 11, wherein the fuel is diesel fuel, and wherein the circuit is further configured to control the variable current to combust the diesel fuel at the nozzle exit.

46. The system of claim 11, wherein the fuel is natural gas, and wherein the circuit is further configured to control the variable current to combust the natural gas at the nozzle exit.

47. The apparatus of claim 1, wherein the coolant passage is external to the fuel injector and provides the coolant to the coil so that the coolant contacts the coil as the coolant flows through the coolant passage, and wherein the coolant passage is separated and sealed from the flow passage for the fuel.

48. The apparatus of claim 47, wherein the coolant comprises an engine oil.

49. The apparatus of claim 47, wherein the coolant comprises air or a high volume gas stream capable of removing heat from the coil.

50. The method of claim 8, wherein the coolant passage is external to the fuel injector and wherein cooling the coil comprises the coolant passage providing the coolant to the coil so that the coolant contacts the coil as the coolant flows through the coolant passage.

51. The method of claim 50, wherein the coolant comprises an engine oil.

52. The method of claim 50, wherein the coolant comprises air or a high volume gas stream capable of removing heat from the coil.

53. The system of claim 11, wherein the coolant passage is external to the fuel injector and provides the coolant to the electromagnetic inductor so that the coolant contacts the electromagnetic inductor as the coolant flows through the coolant passage, and wherein the coolant passage is separated and sealed form the flow passage for the fuel.

54. The system of claim 53, wherein the coolant comprises an engine oil.

55. The system of claim 53, wherein the coolant comprises air or a high volume gas stream capable of removing heat from the electromagnetic inductor.

* * * * *